United States Patent
Jin et al.

(10) Patent No.: US 10,401,836 B2
(45) Date of Patent: Sep. 3, 2019

(54) METHODS AND APPARATUS TO SETUP SINGLE-USE EQUIPMENT/PROCESSES

(71) Applicant: Fisher-Rosemount Systems, Inc., Round Rock, TX (US)

(72) Inventors: Zuwei Jin, Audubon, PA (US); Stephen George Murray, Round Rock, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 595 days.

(21) Appl. No.: 15/076,188

(22) Filed: Mar. 21, 2016

(65) Prior Publication Data
US 2017/0269578 A1  Sep. 21, 2017

(51) Int. Cl.
G05B 19/409 (2006.01)
G05B 19/418 (2006.01)

(52) U.S. Cl.
CPC ..... *G05B 19/41835* (2013.01); *G05B 19/409* (2013.01); *G05B 2219/32128* (2013.01); *G05B 2219/32161* (2013.01); *Y02P 80/40* (2015.11); *Y02P 90/02* (2015.11)

(58) Field of Classification Search
CPC .............. G05B 19/409; G05B 19/41835
USPC ........................................................ 700/117
See application file for complete search history.

(56) References Cited

U.S. PATENT DOCUMENTS

| | | | |
|---|---|---|---|
| 5,890,155 A | 3/1999 | Steinman et al. | |
| 7,043,311 B2 | 5/2006 | Nixon et al. | |
| 7,848,829 B2 | 12/2010 | Nixon et al. | |
| 8,407,716 B2 | 3/2013 | Nixon et al. | |
| 2001/0018700 A1 | 8/2001 | Clarke et al. | |
| 2005/0060048 A1 | 3/2005 | Pierre et al. | |
| 2005/0171746 A1* | 8/2005 | Thalhammer-Reyero | G05B 17/02 703/2 |
| 2009/0249367 A1 | 10/2009 | Koniki et al. | |
| 2015/0137992 A1* | 5/2015 | Potyrailo | G01N 27/3272 340/870.07 |

OTHER PUBLICATIONS

Surman et al.; Temperature-independent passive RFID pressure sensors for single-use bioprocess components; Apr. 14, 2011; IEEE; 2011 IEEE International Conference Proceedings.*

Intellectual Property Office of the United Kingdom, "Search Report," issued in connection with Patent Application No. GB1703579.1, dated Aug. 2, 2017, 6 pages.

"Syncade Smart Operation Management Smart Data. Smart Decisions," Emerson Process Management, 2009, 16 pages.

(Continued)

*Primary Examiner* — David T Welch
(74) *Attorney, Agent, or Firm* — Hanley, Flight & Zimmerman, LLC.

(57) ABSTRACT

Methods, apparatus, systems and articles of manufacture are disclosed to setup single-use equipment/processes. An example disclosed herein includes configuring a control interface via an object-oriented programming interface, the object-oriented programming interface including an object class representative of a single-use component in the single-use process. The example method also includes activating a single-use object in the control interface by detecting all ports associated with the single-use component are connected, and verifying the single-use component.

20 Claims, 20 Drawing Sheets

Graphical Control Interface with an Activated Single-Use Component

(56) References Cited

OTHER PUBLICATIONS

"Operator Station Software Suite," Product Data Sheet, Emerson Process Management, Jun. 2014, 7 pages.
"Recipe Studio," Product Data Sheet, Emerson Process Management, Jun. 2015, 3 pages.
"Configuration Software Suite," DeltaV Product Data Sheet, Emerson Process Management, Jan. 2013, 6 pages.

* cited by examiner

| Object ID | Part Number | Port ID | Clamp ID | Contact Position | Electrical Connection |
|---|---|---|---|---|---|
| SU_TH1 | T-000201 | TH1Port_A | Clamp 408 | R | N/A |
|  |  | TH1Port_B | Clamp 406 | L |  |
| SU_MB1 | B-200499 | MB1Port_A | Clamp 406 | R | True |
|  |  | MB1Port_B | Clamp 424 | R |  |
|  |  | MB1Port_C | Clamp 418 | L |  |
|  |  | MB1Port_D | Clamp 412 | L |  |
| ... |  | ... | ... | ... | ... |
| SU_P1 | P-393092 | P1Port_A | Clamp 426 | R | True |
|  |  | P1Port_B | Clamp 424 | L |  |

Equipment Setup Table

FIG. 5

| Part Number ~605 | Pre-Allocated Lot Number ~610 | Quantity ~615 | Unit of Measurement ~620 |
|---|---|---|---|
| T-000201 | 237925359 | 3 | Each |
| B-200499 | 9075555551 | 3 | Each |
| ... | ... | ... | ... |
| P-393092 | N/A | 4 | Each |
| ... | ... | ... | ... |
| C-93475 | N/A | 200 | L |

↗ 650
↗ 655
↗ 660
↗ 665

600 ↗

Bill of Materials Table

FIG. 6

| Object ID | Verifying Part Number | Verifying Lot Number | Scanned Part Number | Scanned Lot Number | Port ID | Port Connection Status | Activation Status |
|---|---|---|---|---|---|---|---|
| SU_TH1 | T-000201 | 237925359 | N/A | N/A | TH1Port_A | Connected | Inactive |
| | | | | | TH1Port_B | Not Connected | |
| SU_MB1 | B-200499 | 9075555555t | B-200499 | 9075555555t | MB1Port_A | Connected | Active |
| | | | | | MB1Port_B | Connected | |
| | | | | | MB1Port_C | Connected | |
| | | | | | MB1Port_D | Connected | |
| ⋮ | | | | | | | |
| SU_P1 | P-393092 | N/A | P-393092 | N/A | P1Port_A | Connected | Active |
| | | | | | P1Port_B | Connected | |

SU Object Status Table

FIG. 7

Graphical Control Interface with a Verified Port Connection

Graphical Control Interface with an Activated Single-Use Component

Fully-Activated Graphical Control Interface

METHODS AND APPARATUS TO SETUP SINGLE-USE EQUIPMENT/PROCESSES

FIELD OF THE DISCLOSURE

This disclosure relates generally to process control systems and, more particularly, to methods and apparatus to setup single-use equipment/processes.

BACKGROUND

Implementation of single-use components in equipment/process(es) has been increasing in industries such as biopharmaceuticals. For example, single-use equipment/process(es) is being widely adopted in upstream bioreactors, media/solution preparation, etc. In contrast to fixed (or permanent) components, which do not need to be re-validated once commissioned, single-use components need to be validated prior to each batch. For example, once a single-use component is used, the single-use component is no longer considered sterile and must be replaced with a new single-use component for qualified use. While single-use equipment/process(es) were originally developed for small-scale processes, such as pre-clinical and clinical phase one manufacturing, it is now generally agreed that single-use equipment/process(es) may also be more economical than traditional stainless-steel fixed installations, even at commercial scales, because of the elimination of clean-in-place (CIP) and sterilization-in-place (SIP) processes. Single-use equipment/process(es) combined with manufacturing execution system(s) (MES) may be the fastest approach to proof-of-concept of a new drug. As a result, use of single-use equipment/process(es) and MES has been a fast-growing trend in industries such as pharmaceuticals.

SUMMARY

Example methods and apparatus to setup single-use equipment/processes are described. An example method includes configuring a control interface via an object-oriented programming interface, the object-oriented programming interface including an object class representative of a single-use component in the single-use process. The example method also includes activating a single-use object in the control interface by detecting all ports associated with the single-use component are connected and verifying the single-use component.

An example apparatus includes a processor system and a memory communicatively coupled to the processor system, the memory including stored instructions that enable the processor system to configure a control interface via an object-oriented programming interface, the object-oriented programming interface including an object class representative of a single-use component in the single-use process. The instructions also cause the processor system to verify the single-use component to activate the single-use (SU) object in the control interface when all ports associated with the single-use component are connected, the SU object an instance of the object class.

An example tangible computer readable storage medium includes instructions that, when executed, cause a machine to at least configure a control interface via an object-oriented programming interface, the object-oriented programming interface including an object class representative of a single-use component in a single-use process. The example instructions also cause the machine to activate the single-use (SU) object in the control interface by detecting all ports associated with the single-use component are connected, and verifying the single-use component, the SU object an instance of the object class.

An example apparatus includes a bracket, a clamping section and a clamp manager. The bracket is embedded with a first connection sensor. The clamping section is pivotally coupled to the bracket, the clamping section embedded with a second connection sensor, the first connection sensor and the second connection sensor to detect when the apparatus is in a closed-position or in an open-position. The clamp manager is to communicate a signal indicative of a change in position.

BRIEF DESCRIPTION OF THE DRAWINGS

FIG. 5 is an example data table that may be used by the example PAS platform of FIGS. 1 and/or 2 to verify single-use equipment/process(es) setup.

FIG. 6 is an example data table that may be used by the example PAS platform of FIGS. 1 and/or 2 to verify single-use equipment/process(es) setup.

FIG. 7 is an example data table that may be used by the example PAS platform of FIGS. 1 and/or 2 to monitor activation statuses of SU objects.

Wherever possible, the same reference numbers will be used throughout the drawing(s) and accompanying written description to refer to the same or like parts.

DETAILED DESCRIPTION

Figure 1:
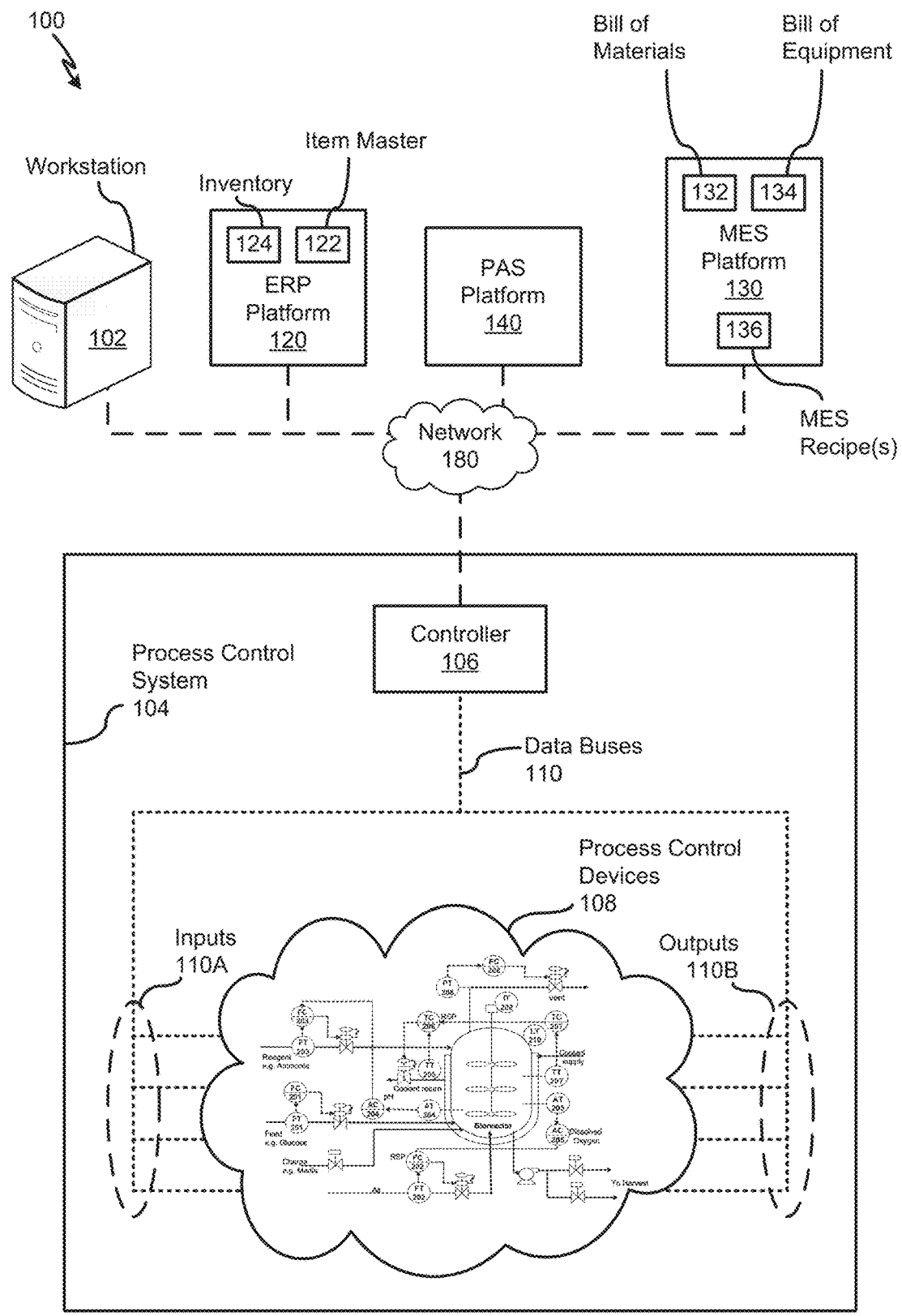
FIG. 1 illustrates an example process control environment within which the teachings of this disclosure may be implemented.

A process control environment may be used to implement batch processes in which, for example, workstations or controllers execute a batch executive routine, which is a high-level control routine that directs the operation of one or more of process control devices to perform a series of different steps (commonly referred to as phases) needed to produce a product, such as a particular type of buffer. To implement different phases, the batch executive routine uses recipes, which specify the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run. Each of the steps defines a phase of the batch run and the batch executive routine within the controller(s) may execute a different control algorithm for the respective phases. Of course, the specific materials, amounts of materials, heating temperatures, times, etc. may be different for different recipes and, consequently, these parameters may change from batch run to batch run depending on the product being manufactured or produced and the recipe being used.

However, before a batch process can be executed, it is important to qualify (e.g., verify and validate) the equipment and flowpath connections involved in the process. Traditionally, process systems employing a fixed-setup, such as stainless steel equipment, perform qualification (e.g., installation qualification, operational qualification and performance qualification) when the process system is being commissioned. Once the process system is qualified, the equipment and flowpath connections in the process system do not need to be re-qualified unless a change to the equipment or connections is made. Thus, fixed-setup systems may be thought of as "set-it and forget-it" systems.

However, the traditional qualification process (e.g., installation qualification, operational qualification and performance qualification) cannot be applied in single-use equipment/process(es) because assembling a single-use equipment/process is essentially a part of each batch operation where single-use equipment is included. For example, the equipment and flowpath connections in a single-use process must be re-qualified before each batch is executed. As a result, ensuring single-use components have been correctly assembled, connected and properly documented is critical to single-use equipment/process operation and has been a major challenge, for example, in regulated industries such as biopharmaceuticals.

Examples disclosed herein provide a single-use equipment/process (SUE) verification system. The example SUE verification system includes an example control interface to facilitate setup of the single-use equipment/process. For example, disclosed examples include building a graphical control interface using class objects (e.g., SU objects) representing single-use components. In some examples, the graphical control interface is designed using object-oriented programming protocols.

The example SUE verification system disclosed herein also includes an example equipment setup table to facilitate verifying the correct single-use component is used during setup. For example, the example equipment setup table may provide a listing of single-use components used in the SUE and characteristics, such as component verifying information (e.g., a part number, a model number, etc.), associated with the single-use component.

In operation, the graphical control interface provides a blueprint for setup of single-use components. In some disclosed examples, the SUE verification system includes smart-clamps to detect when a physical connection is made. For example, when the smart-clamp is moved into a closed-position, the smart-clamp determines whether it is in contact with a single-use component and transmits a signal identifying which, if any, contact position of the smart-clamp is in contact with the single-use component. The example SUE verification system may monitor smart-clamp signals to determine when all ports of a single-use component are connected.

In some examples, when all ports of a single-use component are determined to be connected (e.g., based on signals received from one or more smart-clamps), the example SUE verification system retrieves (e.g., scans) component identifying information from the single-use component and compares the retrieved component identifying information to the component verifying information stored in the equipment setup table. In some examples, the SUE verification system may prompt a user to scan the single-use component. In some examples, the smart-clamps may be provided with barcode readers that scan (e.g., automatically scan) the single-use component when prompted. In some examples, if the SUE verification system determines that the retrieved component identifying information and the stored equipment verifying information do not match, the SUE verification system disclosed herein may issue an alert and the user may be provided an opportunity to replace the incorrect single-use component with the correct single-use component.

As used herein, the term "single-use component" refers to an item (or device) that is used to implement being assembled in an equipment system or a process and that is designed or configured to be discarded after completing a batch process, for example, a multi-component setup.

As used herein, the term "single-use equipment/process" refers to the equipment or process including at least a single-use component in its processing flowpath.

As used herein, the term "SU object class" refers to a class definition of objects that are representative of single-use components in an object-oriented programming protocol.

As used herein, the term "SU object" refers to a graphic object in a control interface generated as an instance of the SU object class.

FIG. 1 is a block diagram of an example process control environment 100 including an example workstation 102 and an example process control system 104. The example workstation 102 may include any computing devices including a personal computer, a laptop, a server, a controller, a smartphone, a microcomputer, etc. Additionally, the example workstation 102 may be implemented using any suitable computer system or processing platform (e.g., an example processor platform 2000 illustrated in FIG. 20). For example, the workstation 102 may be implemented using a single processor personal computer, single or multi-processor workstations, etc.

The example process control system 104 may include any type of manufacturing facility, process facility, automation facility, safety-instrumented facility and/or any other type of process control structure or system. In some examples, the process control system 104 may include multiple facilities located at different locations. Additionally, the example process control environment 100 may include other process control systems (not shown) that may be included with the same facility and/or located at a different facility.

The example process control environment 100 of FIG. 1 is provided to illustrate one type of environment within which the example methods and apparatus described in greater detail below may be advantageously employed. However, the example methods and apparatus disclosed herein may, if desired, be employed in other systems of greater complexity or less complexity than the example process control environment 100 and/or the example process control system 104 shown in FIG. 1 and/or systems that are used in connection with process control activities.

The example process control system 104 of FIG. 1 includes an example controller 106 that is communicatively coupled to the workstation 102. The example process control system 104 of FIG. 1 also includes process control devices 108 (e.g., input and/or output devices). The process control devices 108 may include any type(s) of process control component(s) capable of receiving inputs, generating outputs and/or controlling a process or a control loop. In the illustrated example of FIG. 1, the process control devices 108 represent single-use equipment/process(es), such as a system made up of transfer hoses, mixing bags, etc. However, other process control systems 104 may include a combination of single-use equipment/process(es) and fixed-setup (e.g., permanent or reusable) equipment/process(es). The process control devices 108 may include control devices such as valves, pumps, fans, heaters, coolers and/or mixers to control a process. Additionally, the process control devices 108 may include one or more measurement or monitoring devices such as pH sensors, temperature sensors, pressure gauges, gauges, fluid level meters, flow meters, vapor sensors, etc., to measure portions of a process. The example process control devices 108 of FIG. 1 may receive instructions from the controller 106 via inputs 110A to execute a specified command and cause a change to the process implemented and/or controlled by the process control devices 108. Furthermore, the measurement or monitoring devices may measure process data, environment data, input device data, etc., and transmit the measured data via outputs 110B to the controller 106 as process data. This process data may include the values of variables (or parameters) corresponding to a measured output from each of the process control devices 108.

In the illustrated example of FIG. 1, the example controller 106 communicates with the process control devices 108 within the process control system 104 via the inputs 110A and/or the outputs 110B. The example inputs 110 and the example outputs 112 may be implemented by a data bus 110. In some examples, the data bus 110 may be coupled to intermediate communication components (e.g., field junction boxes, marshalling cabinets, etc.) within the process control system 104. Furthermore, the communication components may include input/output (I/O) devices (e.g., an I/O card) to receive data from the process control devices 108 and convert (or translate) the data into communications capable of being received and processed by the example controller 106. Additionally, the I/O devices may convert (or translate) data or communications from the controller 106 into a data format capable of being processed by the corresponding process control devices 108. In an example, the data bus 110 may be implemented using the Fieldbus protocol or other types of wired (e.g., Profibus, DeviceNet, Foundation Fieldbus, etc.) and/or wireless communication protocols (e.g., Wireless HART (Highway Addressable Remote Transducer) protocol, etc.).

In the illustrated example of FIG. 1, the example controller 106 manages one or more process control routines (e.g., process control algorithms, functions and/or instructions) to control the process control devices 108 within the process control system 104. The controller 106 may be implemented by, for example, the DeltaV™ controller sold by Emerson Process Management. The example controller 106 controls routines to calculate process data based on the outputs 110B from the process control devices 108 for process control applications including, for example, monitoring applications, alarm management applications, process trending and/or history applications, diagnostic applications, batch processing and/or campaign management applications, statistical applications, streaming video applications, advanced control applications, safety instrumented applications, event applications, etc. The controller 106 forwards process data to the workstation 102 at periodic intervals and/or upon processing or generating the process data. The process data transmitted by the controller 106 may include process control values, data values, alarm information, text, block mode, element status information, diagnostic information, error messages, parameters, events, and/or device identifiers.

In the example illustrated in FIG. 1, the workstation 102 executes process control applications. The process control applications communicate with the example controller 106 to monitor, control, and/or diagnose the process control devices 108. For example, the process control applications may include control automation, graphical representations of the process control system 104, user management, process control editing, data collection, data analysis, etc. In some examples, a display connected to the workstation 102 displays the process control applications via a user interface to render process data in a graphical format to enable a user of the workstation 102 to graphically view (via an application) the process data generated by the process control devices 108.

In the illustrated example of FIG. 1, the process control environment 100 includes an example enterprise resource planning (ERP) platform 120, an example manufacturing execution system (MES) platform 130 and an example process automation systems (PAS) platform 140. The example platforms 120, 130, 140 may be implemented using one or more servers in communication with one or more data stores.

In the illustrated example of FIG. 1, the ERP platform 120 tracks business resources at an enterprise-level. For example, the ERP platform 120 may establish a basic plant schedule, including production, material use, delivery and/or shipping. The example ERP platform 120 of FIG. 1 includes an example item master 122 and an example inventory 124. The example item master 122 defines all information (e.g., characteristics) regarding materials, components, etc. available to the enterprise. The example inventory 124 indicates quantities of items (e.g., materials) available to the enterprise. In the illustrated example, the item master 122 and the inventory 124 are represented as lists. However, other types of data structures (e.g., spreadsheets, data tables, etc.) may additionally or alternatively be used.

In the illustrated example of FIG. 1, the MES platform 130 manages operation workflow (e.g., processing steps) with both manual and process automation systems that perform automated equipment control. Examples of manual workflow include performing material charges, filter changes, etc. Examples of automated processing steps include heating phases, agitation, material transfers, etc. In the illustrated example, the MES platform 130 provides solutions that support primary production processes in the example process control environment 100.

In the illustrated example, the MES platform 130 tracks and documents transformation of raw materials to finished goods. For example, the MES platform 130 of FIG. 1 includes an example bill of materials (BOM) 132, an example bill of equipment (BOE) 134 and example MES recipe(s) 136. The example bill of materials 132 is a list of materials (e.g., raw materials) that may be consumed when manufacturing a product. During execution of a process, when material is consumed, the amount of the material consumed is charged to the inventory 124 according to the BOM 132 (e.g., removed from the available quantity). For example, cleaning solutions may be included in the BOM 132. The example bill of equipment 134 is a list of equipment that is used to manufacture a product. For example, a skid that holds a mixing bag may be included in the BOE 134. In some instances, a resource may be included in the BOM 132 and the BOE 134. The example MES recipe(s) 136 may include manual processing steps and automated processing steps to manufacture a product.

In the illustrated example of FIG. 1, the process control environment 100 includes the PAS platform 140 to facilitate setup of single-use equipment/process(es). The example PAS platform 140 provides a graphical control interface for process control of the single-use equipment/process(es). In some examples, the graphical control interface may be designed as the graphical representation of the single-use equipment/process(es). The example PAS platform 140 utilizes an equipment setup table to verify the single-use component installed is the correct single-use component.

In some examples, the PAS platform 140 facilitates monitoring, supervising and automating control of the single-use equipment/process(es). For example, the PAS platform 140 may facilitate batch-level automation in the process control environment 100. The PAS platform 140 may include multiple applications stored within and executed by different devices located at diverse places with the process control environment. For example, the PAS platform 140 may include an example configuration application (or configuration interface) and an example operation application (or operation interface).

In the illustrated example of FIG. 1, the workstation 102 is communicatively coupled to the controller 106 and the platforms 120, 130, 140 via an example network 180. The example network 180 of the illustrated example of FIG. 1 is the Internet. However, the example network 180 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 180 enables the workstation 102 to be in communication with the controller 106 and/or the platforms 120, 130, 140. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

Figure 2:
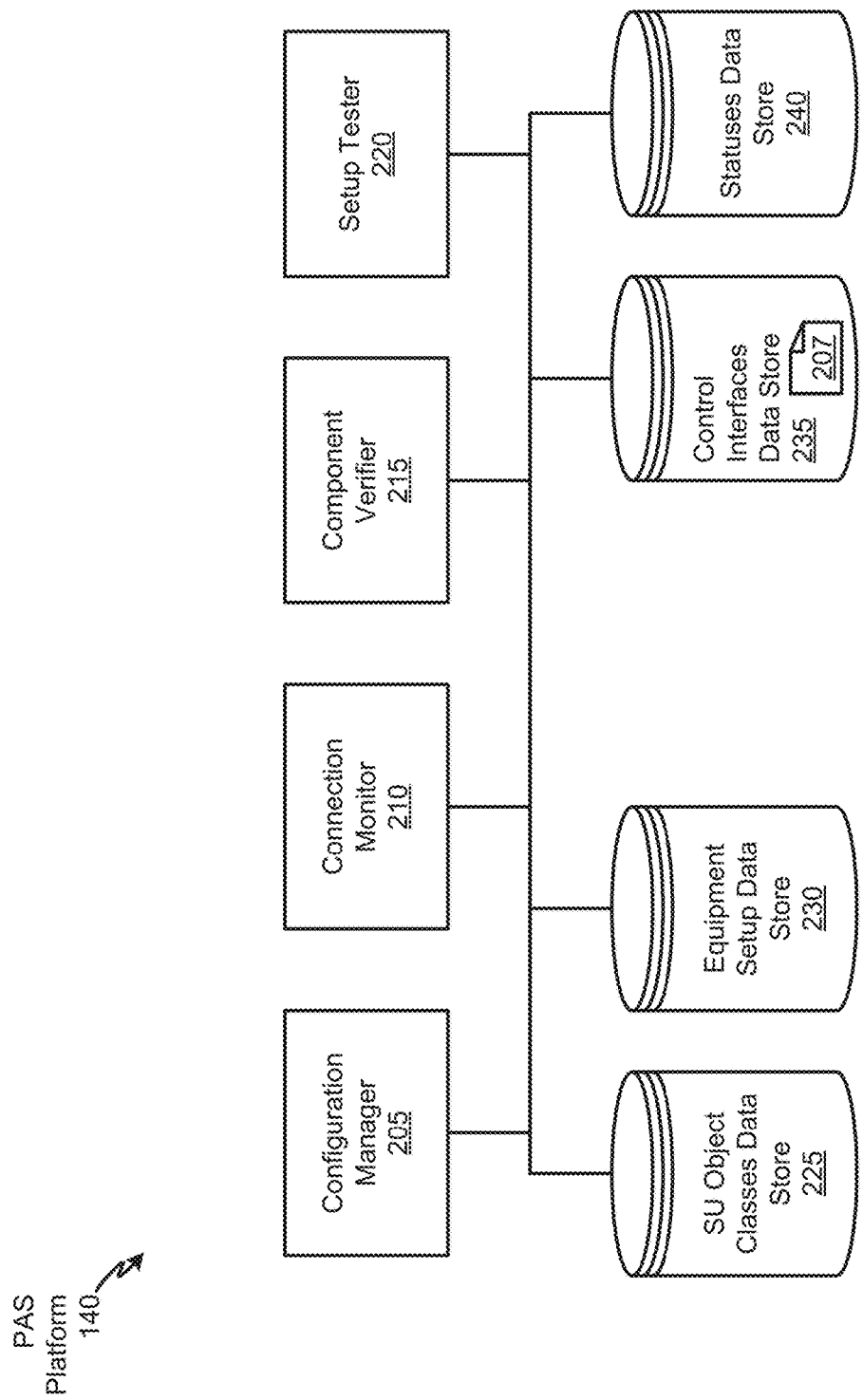
FIG. 2 is a block diagram of an example implementation of the process automation systems (PAS) platform of FIG. 1.

FIG. 2 is a block diagram of an example implementation of the PAS platform 140 of FIG. 1 that may facilitate setup of single-use equipment process(es). The PAS platform 140 of the illustrated example includes an example configuration manager 205, an example connection monitor 210, an example component verifier 215, an example setup tester 220, an example SU object classes data store 225, an example equipment setup data table 230, an example control interfaces data store 235 and an example statuses data store 240. Although the example data stores 225, 230, 235, 240 are illustrated as separate data stores in the illustrated example of FIG. 2, one or more of the data stores 225, 230, 235, 240 may be combined into one or more data stores. Additionally, one or more of the data stores 225, 230, 235, 240 may be included in the ERP platform 120 and/or the MES platform 130.

The PAS platform 140 of FIG. 2 is provided the example configuration manager 205 to facilitate configuration of a control interface. In some examples, the example configuration manager 205 provides a user interface (e.g., a configuration interface) via the workstation 102. The example configuration manager 205 provides a graphical module approach to configuring an example control interface 207. For example, the configuration manager 205 facilitates designing the control interface 207 that is a graphical representation of the process control system 104.

In the illustrated example, the control interface 207 may include one or more objects from different object classes, wherein each object is a part or a subroutine of an overall control routine and operates in conjunction with other objects to implement a control strategy. As is well known, objects, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 104. Additionally or alternatively, other techniques such as hybrid and other types of complex function blocks (e.g., model predictive controllers (MPCs), optimizers, etc.) may also be used.

In the illustrated example, the configuration application includes and/or accesses an example SU object classes data store 225. As used herein, an object class defines the properties (e.g., parameters) and methods (e.g., actions) available to an object. Typically, the control interfaces 207 are made up of communicatively interconnected function blocks, which are objects in an object-oriented programming program that perform functions based on inputs provided thereto and provide outputs to other function blocks within the control interface 207. As used herein, an object represents a process control device 108 and its related control logic. An example implementation of the control interface 207 is discussed in connection with FIG. 4. The example configuration manager 205 of the illustrated example records the control interface 207 in the example control interfaces data store 235.

In the illustrated example, when an object (e.g., from the SU object classes data store 225) is created in the control interface 207, the example configuration manager 205 facilitates generating an object with attributes representative of the corresponding single-use component. For example, a user (e.g., a configuration engineer, an automation engineer, etc.) may drag-and-drop an object representative of a single-use transfer hose from the SU object classes data store 225 to the control interface 207. The configuration manager 205 then specifies a number of ports and/or other inputs/outputs (I/Os) associated with the single-use transfer hose and generates a single-use (SU) object representative of the single-use transfer hose from the SU object classes data store 225. In some examples, the configuration manager 205 may prompt a user, for example, via a display, to specify the number of ports and/or I/Os associated with the single-use component. In the illustrated example, the SU object may include properties such as an object identifier, a part number, a lot number, input/output identifiers, etc. An example implementation of an SU object is discussed in connection with an example SU object 300 of FIG. 3.

In addition to generating an SU object, the example configuration manager 205 of the illustrated example also creates an equipment setup table based on the single-use components included in the SUE. The equipment setup table facilitates verifying the correct single-use component is used during setup of the SUE. In some examples, the configuration manager 205 prompts the user (e.g., via a user interface) to populate one or more fields of the equipment setup table. For example, the configuration manager 205 may request the user provide a part number, a lot number, port identifier-clamp mappings, etc. An example implementation of an example equipment setup table 500 is discussed in connection with FIG. 5. The example configuration manager 205 of the illustrated example records the equipment setup table in the example equipment setup data store 230.

In some examples, the configuration manager 205 may retrieve bill of materials entries related to the single-use components. For example, the configuration manager 205 may use the part number associated with the single-use component and/or the SU object to query the bill of materials 132 (e.g., via the MES platform 130) for attributes/characteristics of the single-use component. For example, the configuration manager 205 may query the bill of materials 132 for a lot number associated with the single-use component in instances where a specific lot is required.

The PAS platform 140 of FIG. 2 is provided the example connection monitor 210 to monitor port connections in the example SUE during setup. In the illustrated example of FIG. 2, the connection monitor 210 receives signals from one or more clamp(s) in the SUE during setup. For example, when a first single-use component is connected via a clamp, the clamp may transmit a signal identifying the clamp identifier and/or the contact position(s) of the clamp that are engaged with the first single-use component. The example connection monitor 210 processes the clamp signal and maps it to a port identifier. For example, the connection monitor 210 may identify a single-use component and its port based on the clamp signal.

In some examples, the connection monitor 210 updates a status table associated with the SU object based on detected port connections. For example, the connection monitor 210 may update an SU objects status table (e.g., an example SU objects status table 700 of FIG. 7) to identify which port connections are established. An example implementation of a control interface having a single-use component with a verified port connection is discussed below in connection with FIG. 8. The connection monitor 210 may also identify when all ports of a single-use component are connected and request a component scan. For example, the connection monitor 210 may prompt the user (e.g., via the user interface) to scan a single-use component when the connection monitor 210 determines all ports of the single-use component are connected. An example implementation of a control interface including a request to scan a single-use component is discussed below in connection with FIG. 9. The connection monitor 210 may store the scanned values (e.g., component identifying information such as a part number, a lot number, etc.) in the corresponding fields of the SU object. The example connection monitor 210 may also identify when all SU objects in the control interface 207 are activated.

The PAS platform 140 of FIG. 2 is provided the example component verifier 215 to verify single-use components installed in the SUE are the correct components. As discussed above, the connection monitor 210 stores component identifying information in the corresponding fields of the SU object. In the illustrated example, the component verifier 215 retrieves the component identifying information from the SU object and compares it to stored values (e.g., component verifying information). For example, the component verifier 215 may compare the scanned part number value retrieved from the SU object to the part number value stored in the equipment setup table. Additionally or alternatively, the component verifier 215 may compare the scanned lot number value retrieved from the SU object to the lot number value stored in the BOM 132. If the component verifier 215 determines that the component identifying information (e.g., the part number and/or the lot number) does not match the component verifying information, the component verifier 215 may issue a warning and prevent a user from proceeding with setup of the SUE. For example, the component verifier 215 may present an alarm via the user interface (e.g., an operator interface). In the illustrated example, when the component verifier 215 determines that the component identifying information matches the component verifying information, the component verifier 215 updates the activation status of the SU object. For example, the component verifier 215 may change the activation status of the SU object from an "inactive" state to an "active" state. An example implementation of updated activation statuses is discussed below in connection with an example SU object status table 700 of FIG. 7. An example implementation of a control interface including an activated SU object is discussed below in connection with FIG. 10.

The PAS platform 140 of FIG. 2 is provided the example setup tester 220 to test connections in the SUE. For example, the setup tester 220 may monitor the SU object status table 700 of FIG. 7 to determine when all SU objects are activated. In the illustrated example, when the setup tester 220 determines all SU objects are activated (e.g., via the SU object status table 700 of FIG. 7), the setup tester 220 checks the electrical connections of the single-use components. In some examples, when the single-use component electrical connections are verified, the example setup tester 220 activates the whole control interface. An example implementation of an activated control interface is discussed below in connection with FIG. 11.

In some examples, the setup tester 220 performs one or more integrity tests on the SUE. For example, the setup tester 220 may check the pressure hold and/or measure the mass of air and/or water required to fill the system (e.g., to a specified pressure). If the setup tester 220 determines that the results of the integrity test did not satisfy specified thresholds, the example setup tester 220 may issue a warning and may prevent a user from operating the SUE until the integrity test is satisfied. For example, the setup tester 220 may present an alert indicating that the results of the integrity test failed to satisfy specifications (e.g., acceptable threshold values). If the setup tester 220 determines that the results did satisfy the specifications, the example setup tester 220 may present a message indicating that the SUE is ready for executing a batch.

In the illustrated example of FIG. 2, the example PAS platform 140 includes the example SU object classes data store 225 to store object classes (e.g., SU objects) to build and/or design control interfaces representative of SUEs. The example SU object classes data store 225 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example SU object classes data store 225 may additionally or alternatively be implemented by one or more double data rate (DDR) memories, such as DDR, DDR2, DDR3, mobile DDR (mDDR), etc. The example SU object classes data store 225 may additionally or alternatively be implemented by one or more mass storage devices such as hard disk drive(s), compact disk drive(s), digital versatile disk drive(s), etc. While in the illustrated example the SU object classes data store 225 is illustrated as a single database, the SU object classes data store 225 may be implemented by any number and/or type(s) of databases.

In the illustrated example of FIG. 2, the example PAS platform 140 includes the example equipment setup data store 230 to store equipment setup information (e.g., component verifying information). An example equipment setup table 500 of the illustrated example of FIG. 5 illustrates example single-use components and/or characteristics of single-use components that may be recorded in the example equipment setup data store 230. The example equipment setup data store 230 may be implemented by a volatile memory (e.g., an SDRAM, DRAM, RDRAM, etc.) and/or a non-volatile memory (e.g., flash memory). The example equipment setup data store 230 may additionally or alternatively be implemented by one or more DDR memories, such as DDR, DDR2, DDR3, mobile DDR (mDDR), etc. The example equipment setup data store 230 may additionally or alternatively be implemented by one or more mass storage devices such as hard disk drive(s), compact disk drive(s), digital versatile disk drive(s), etc. While in the illustrated example the equipment setup data store 230 is illustrated as a single database, the equipment setup data store 230 may be implemented by any number and/or type(s) of databases.

In the illustrated example of FIG. 2, the example PAS platform 140 includes the example control interfaces data store 235 to store control interfaces (e.g., the example control interface 207) built and/or designed as representations of SUEs. The example control interfaces data store 235 may be implemented by a volatile memory (e.g., an SDRAM, DRAM, RDRAM, etc.) and/or a non-volatile memory (e.g., flash memory). The example control interfaces data store 235 may additionally or alternatively be implemented by one or more double data rate (DDR) memories, such as DDR, DDR2, DDR3, mDDR, etc. The example control interfaces data store 235 may additionally or alternatively be implemented by one or more mass storage devices such as hard disk drive(s), compact disk drive(s), digital versatile disk drive(s), etc. While in the illustrated example the control interfaces data store 235 is illustrated as a single database, the control interfaces data store 235 may be implemented by any number and/or type(s) of databases.

In the illustrated example of FIG. 2, the example PAS platform 140 includes the example statuses data store 240 to store SU object statuses associated with SU objects. An example SU objects status table 700 of the illustrated example of FIG. 7 illustrates SU object statuses that may be recorded in the example statuses data store 240. The example statuses data store 240 may be implemented by a volatile memory (e.g., an SDRAM, DRAM, RDRAM, etc.) and/or a non-volatile memory (e.g., flash memory). The example statuses data store 240 may additionally or alternatively be implemented by one or more double data rate (DDR) memories, such as DDR, DDR2, DDR3, mDDR, etc. The example statuses data store 240 may additionally or alternatively be implemented by one or more mass storage devices such as hard disk drive(s), compact disk drive(s), digital versatile disk drive(s), etc. While in the illustrated example the statuses data store 240 is illustrated as a single database, the statuses data store 240 may be implemented by any number and/or type(s) of databases.

While an example manner of implementing the example PAS platform 140 of FIG. 1 is illustrated in FIG. 2, one or more of the elements, processes and/or devices illustrated in FIG. 2 may be combined, divided, re-arranged, omitted, eliminated and/or implemented in any other way. Further, the example configuration manager 205, the example connection monitor 210, the example component verifier 215, the example setup tester 220, the example SU object classes data store 225, the example equipment setup data store 230, the example control interfaces data store 235, the example statuses data store 240 and/or, more generally, the example PAS platform 140 of FIG. 1 may be implemented by hardware, software, firmware and/or any combination of hardware, software and/or firmware. Thus, for example, any of the example configuration manager 205, the example connection monitor 210, the example component verifier 215, the example setup tester 220, the example SU object classes data store 225, the example equipment setup data store 230, the example control interfaces data store 235, the example statuses data store 240 and/or, more generally, the example PAS platform 140 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example configuration manager 205, the example connection monitor 210, the example component verifier 215, the example setup tester 220, the example SU object classes data store 225, the example equipment setup data store 230, the example control interfaces data store 235, the example statuses data store 240 and/or, more generally, the example PAS platform 140 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example PAS platform 140 of FIG. 1 may include one or more elements, processes and/or devices in addition to, or instead of, those illustrated in FIG. 2, and/or may include more than one of any or all of the illustrated elements, processes and devices.

Figure 3:
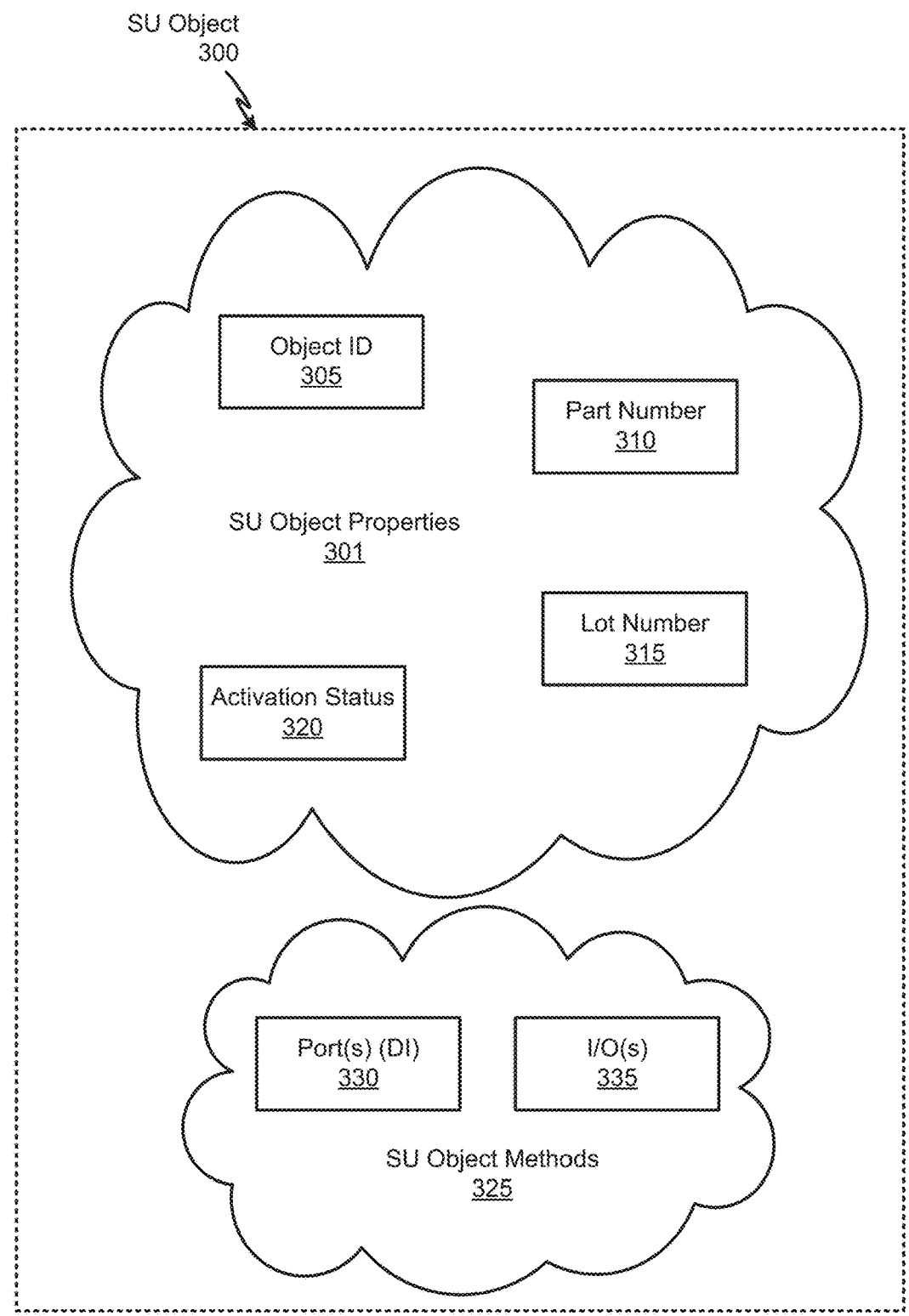
FIG. 3 illustrates an example single-use (SU) object generated by the example configuration manager of FIG. 2.

FIG. 3 illustrates an example SU object 300 associated with a single-use component represented in a control interface. The example SU object 300 of the illustrated example is associated with a single-use component represented in a graphical control interface associated with a SUE. In the illustrated example of FIG. 3, the SU object 300 includes SU object properties 301 and one or more SU object methods 325. The example SU object 300 of FIG. 3 includes SU object properties 301 such as an example object identifier attribute 305, an example part number attribute 310, an example lot number attribute 315 and an example activation status attribute 320. In the illustrated example, the configuration manager 205 of FIG. 2 creates the SU object 300 when a single-use component is added to a graphical control interface associated with a SUE. In addition, the example connection monitor 210 of FIG. 2 may store values for the corresponding SU object in the object attributes 305, 310, 315, 320.

In the illustrated example, the object identifier attribute 305 indicates an identifier of the SU object included in the control interface 207. In the illustrated example, the object identifier attribute 305 is an alphanumeric string that uniquely identifies the SU object. For example, characteristics for a particular SU object may be queried (e.g., retrieved) based on the object identifier value. However, any other approach uniquely identifying SU objects may additionally or alternatively be used.

In the illustrated example, the part number attribute 310 is an alphanumeric string that identifies a part number (or a model number) of a corresponding single-use component. For example, the part number may indicate a particular type of transfer hose (e.g., a ten-foot transfer hose) to use. In the illustrated example, the lot number attribute 315 is an alphanumeric string that indicates a particular lot number to which the corresponding single-use component belongs. For example, a lot number may be associated with one or more single-use components that were manufactured at the same time (or nearly the same time).

In the illustrated example, the connection monitor 210 stores a part number value and/or a lot number value in the custom properties of the SU object 300 when component identifying information (e.g., a port number and/or a lot number) is retrieved (e.g., scanned) from the corresponding single-use component. For example, an operator may scan a bar code affixed to a single-use component and the connection monitor 210 may populate the part number field 310 and/or the lot number field 315 with the corresponding values. In some examples, the operator may manually enter the component identifying information for the corresponding single-use component.

In some examples, a clamp used to implement the physical connection(s) may include a bar code reader to retrieve the component identifying information from the single-use component. In some such instances, the clamp may scan the single-use component for component identifying information in response to a query by the connection monitor 210. However, other techniques for identifying single-use components and/or retrieving component identifying information may additionally or alternatively be used.

In some examples, a single-use component may not be associated with a lot number. In some such instances, the connection monitor 210 stores a value representative of an unavailable value (e.g., "N/A," "null," etc.) in the lot number field 315 of the SU object 300.

In the illustrated example, the activation status attribute 320 identifies the activation status of the SU object. For example, the status of the SU object 300 may be "active" (e.g., when the connection monitor 210 determines that the one or more port(s) associated with the single-use component are connected and the example component verifier 215 verified that the part number stored in the item number field 310 is verified against the component verifying information stored in the equipment setup data store 230 and that the lot number value stored in the lot number field 315 is verified against the component verifying information stored in the bill of materials 132). Additionally, the status of the SU object 300 may be "inactive" (e.g., when the connection monitor 210 determines that one or more of the port(s) associated with the single-use component are not connected and/or the equipment verifier 215 determines that the part number value in the part number field 310 is not verified against the component verifying information stored in the equipment setup data store 230 and/or the lot number value stored in the lot number attribute 315 is not verified against the component verifying information stored in the bill of materials 132).

In some examples, the SU object 300 may include additional or alternative attributes. For example, the SU object 300 may include port identifier attribute(s) corresponding to the one or more ports associated with the single-use component. In some examples, the SU object 300 may include port connection status attribute(s) associated with the corresponding ports. The port connection status may indicate whether the corresponding port is "connected" (e.g., a physical connection is detected) or "not connected" (e.g., a physical connection is not detected).

In some examples, the configuration manager 205 may automatically populate the attributes of the SU object 300. For example, when a transfer hose is added to a graphical control interface, the configuration manager 205 may add two port identifier fields corresponding to an input and an output of the transfer hose. In some examples, the operator may manually enter the desired number of port identifiers associated with the corresponding single-use component.

The example SU object 300 of FIG. 3 includes SU object methods 325 such as an example port(s) (DI) method 330 and an example I/O(s) method 335. In the illustrated example, the example methods 325, 330 define the one or more methods associated with the SU object 300. For example, the ports method 330 facilitates defining the number of ports available to the single-use component represented by the corresponding SU object. The example I/Os method 335 facilitates defining additional or alternative inputs/outputs (e.g., analog input(s), analog output(s), digital input(s), digital output(s), etc.) available to the single-use component represented by the corresponding SU object.

Figure 4:
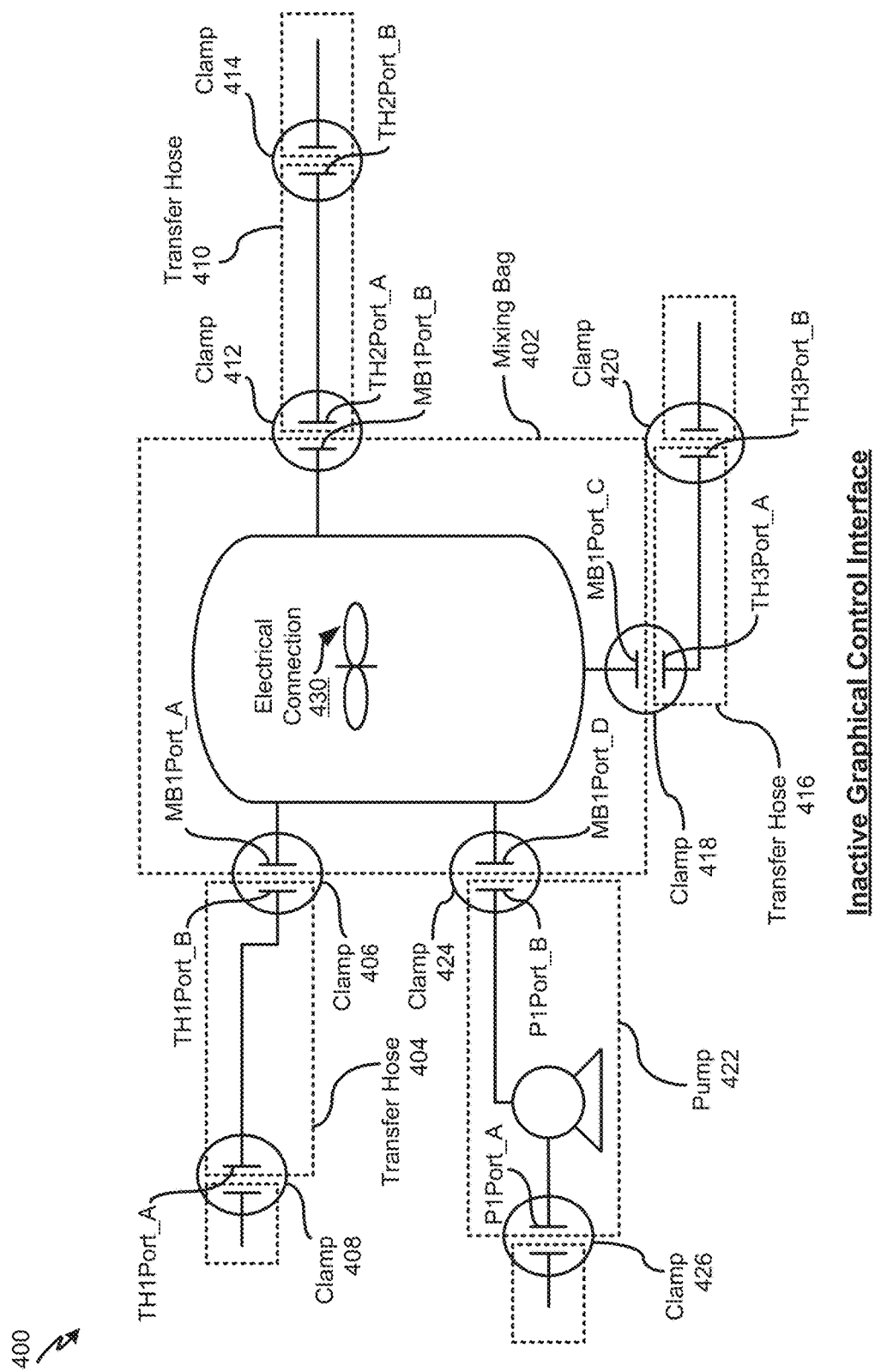
FIG. 4 illustrates an example control interface generated by the PAS platform of FIGS. 1 and/or 2.

FIG. 4 illustrates an example graphical control interface 400 that may be used to setup and verify single-use components in a SUE. In the illustrated example of FIG. 4, the graphical control interface 400 represents physical connections of process control devices 108 in a SUE. The graphical control interface 400 is designed by a user (e.g., an automation engineer) using, for example, the example configuration manager 205 of FIG. 2. For example, the user may design the graphical control interface 400 based on a process flow diagram (PFD) and a piping and instrumentation drawing/diagram (PID) provided for the single-use process control system 104. A PFD represents the flow of materials in the SUE. A PID represents the connections of the instruments in the PFD and focuses on the electrical connections from instruments and/or devices in the SUE. In the illustrated example, the configuration manager 205 stores the graphical control interface 400 in the example control interfaces data store of FIG. 2.

As described above, once the graphical control interface 400 is prepared, the graphical control interface 400 may be utilized by the operator to setup the SUE and to execute the corresponding batch. For example, the graphical control interface 400 may guide the operator in identifying which single-use component to use and how to connect the single-use component in the SUE. For example, the operator may select an SU object included in the graphical control interface 400 and be presented with component verifying information identifying a single-use component (e.g., via a part number and a lot number), a clamp identifier identifying a clamp to couple a port of the single-use component and a contact position of the clamp to couple the single-use component. In some examples, the graphical control interface 400 may prompt the operator to verify connections and/or to scan the single-use component.

The example graphical control interface 400 of FIG. 4 represents an inactive graphical interface. In the illustrated example, an inactive graphical interface indicates that no single-use object is activated and no physical connections have been detected. In some examples, the inactive graphical control interface 400 is presented to a user when the user loads the control interface to setup the SUE. In the illustrated example of FIG. 4, the SUE includes a mixing bag 402 having four ports MB1Port_A, MB1Port_B, MB1Port_C, MB1Port_D. The example mixing bag 402 is coupled to a first transfer hose 404 having two ports TH1Port_A, TH1Port_B, a second transfer hose 410 having two ports TH2Port_A, TH2Port_B, a third transfer hose 416 having two ports TH3Port_A, TH3Port_B and a pump 422 having two ports P1Port_A, P1Port_B. The mixing bag 402 also includes an electrical connection 430.

The example mixing bag 402 is coupled to the first transfer hose 404 via an example clamp 406. In the illustrated example, the left contact position of the clamp 406 clamps port TH1Port_B of the first transfer hose 404 and the right contact position of the clamp 406 clamps the mixing bag port MB1Port_A. The port TH1Port_A of the first transfer hose 404 is clamped by the right contact position of an example clamp 408.

The example mixing bag 402 is coupled to the second transfer hose 410 via an example clamp 412. In the illustrated example, the right contact position of the clamp 412 clamps port TH2Port_A of the second transfer hose 410 and the left contact position of the clamp 412 clamps the mixing bag port MB1Port_B. The port TH2Port_B of the second transfer hose 410 is clamped by the left contact position of an example clamp 414.

The example mixing bag 402 is coupled to the third transfer hose 416 via an example clamp 418. In the illustrated example, the right contact position of the clamp 418 clamps port TH3Port_A of the third transfer hose 416 and the left contact position of the clamp 418 clamps the mixing bag port MB1Port_C. The port TH3Port_B of the third transfer hose 416 is clamped by the left contact position of an example clamp 420.

The example mixing bag 402 is coupled to the pump 422 via an example clamp 424. In the illustrated example, the left contact position of the clamp 424 clamps port P1Port_B of the pump 422 and the right contact position of the clamp 424 clamps the mixing bag port MB1Port_D. The port P1Port_A of the pump 422 is clamped by the right contact position of an example clamp 426.

FIG. 5 is an example equipment setup table 500 that may be generated and/or configured by the example configuration manager 205 (FIG. 2) to store characteristics associated with single-use components included in an SUE. In the illustrated example, the equipment setup table 500 is stored in the example equipment setup data store 230 (FIG. 2). In some examples, the equipment setup table 500 may be stored at the example MES platform 130 of FIG. 1. The example equipment setup table 500 of FIG. 5 includes an example object identifier column 505, an example part number column 510, an example port identifier column 515, an example clamp identifier column 520, an example contact position column 525 and an example electrical connection column 530. The example object identifier column 505 indicates an identifier of an SU object logged by the configuration manager 205. In the illustrated example, the object identifier column 505 is an alphanumeric string that uniquely identifies SU objects. For example, an object identifier value may be used to query (e.g., look-up, retrieve, etc.) characteristics for a particular SU object. However, any other approach uniquely identifying SU objects may additionally or alternatively be used.

The example part number column 510 is an alphanumeric string that identifies a part number (or a model number) of a single-use component. For example, the part number value may indicate a particular type of transfer hose (e.g., a ten-foot transfer hose) to use in the SUE.

The example port identifier column 515 indicates one or more ports associated with the corresponding single-use component. For example, a first transfer hose may have an input port (e.g., TH1Port_A) and an output port (e.g., TH1Port_B). The example clamp identifier column 520 indicates a clamp identifier associated with a corresponding port. The example contact position column 525 indicates a contact position of the clamp associated with the corresponding port. The example electrical connection column 530 indicates whether the corresponding single-use component includes an electrical connection.

The example equipment setup table 500 of the illustrated example of FIG. 5 includes three example rows 550, 555, 560 corresponding to three example single-use component entries. The first example row 550 indicates that a single-use component identified as object "SU_TH1" is of type "T-000201." The first example row 550 also indicates that the object "SU_TH1" has a first port "TH1Port_A" that is to be connected to the "right" contact position of a "clamp 408," and a second port "TH1Port_B" that is to be connected to the "left" contact position of a "clamp 406." The first example row 550 also indicates that the object "SU_TH1" does not include an electrical connection.

The second example row 555 indicates that a single-use component identified as object "SU_MB1" is of type "B-200499." The second example row 555 also indicates that the object "SU_MB1" has a first port "MB1Port_A" that is to be connected to the "right" contact position of a "clamp 406," a second port "MB1Port_B" that is to be connected to the "right" contact position of a "clamp 424," a third port "MB1Port_C" that is to be connected to the "left" contact position of a "clamp 418," and a fourth port "MB1Port_D" that is to be connected to the "left" contact position of a "clamp 412." The second example row 555 also indicates that the object "SU_MB1" includes an electrical connection.

The third example row 560 indicates that a single-use component identified as object "SU_P1" is of type "P-393092." The third example row 560 also indicates that the object "SU_P1" has a first port "P1Port_A" that is to be connected to the "right" contact position of a "clamp 426," and a second port "P1Port_B" that is to be connected to the "left" contact position of a "clamp 424." The third example row 560 also indicates that the object "SU_P1" includes an electrical connection.

While three example single-use component entries are represented in the example equipment setup table 500 of FIG. 5, more or fewer single-use components may be represented in the example equipment setup table 500 corresponding to the number of single-use components included in the SUE.

FIG. 6 is an example bill of materials table 600 that may be stored by the example MES platform 130 and/or the example ERP platform 120 of FIG. 1 to store information identifying the materials (e.g., single-use materials and fixed (e.g., permanent) materials) consumed while producing a product. The example bill of materials table 600 of FIG. 6 includes an example part number column 605, an example pre-allocated lot number column 610, an example quantity identifier column 615 and an example unit of measurement column 620.

The example part number column 605 is an alphanumeric string that identifies a part number (or a model number) of a single-use component. For example, the part number may indicate a particular type of transfer hose (e.g., a ten-foot transfer hose) to setup in the SUE. The example pre-allocated lot number column 610 indicates a particular lot number to which the corresponding single-use component belongs. For example, a lot number value may be associated with one or more components that were manufactured at the same time (or nearly the same time). The example quantity identifier column 615 indicates a number of the corresponding material used (or consumed) to produce the corresponding product. The example unit of measurement column 620 indicates a unit of measurement associated with the corresponding single-use component. For example, a single-use component may be measured by "each."

The example bill of materials table 600 of FIG. 6 includes four example rows 650, 655, 660, 665 corresponding to four example materials entries. The first example row 650 indicates that a material item having part number "T-000201" is included in lot number "237925359." The first example row 650 also indicates that the material item having part number "T-000201" is measured by quantity (e.g., "each" or one). The first example row 650 also indicates that a total of "3" of such material items are to be consumed in the setup of the SUE (e.g., 3 transfer hoses).

The second example row 655 indicates that a material item having part number "B-200499" is included in lot number "907555555t." The second example row 655 also indicates that the material item having part number "B-200499" is measured by quantity (e.g., "each" or one). The second example row 655 also indicates that a total of "3" of such material items are to be consumed in the setup of the SUE (e.g., 3 mixing bags with pH and conductivity monitoring).

The third example row 660 indicates that a material item having part number "P-393092" is not required to be in a particular (e.g., pre-allocated) lot. For example, a "pump" of type "P-393092" is not limited to a particular lot number. The example third row 660 also indicates that the material item having part number "P-393092" is measured by quantity (e.g., "each" or one). The third example row 660 also indicates that a total of "4" of such material items are to be consumed in the setup of the SUE (e.g., 4 pumps).

The example bill of materials table 600 of FIG. 6 also includes material items that are not single-use components. The fourth example row 665 indicates that a material item having part number "C-93475" is not required to be in a particular (e.g., pre-allocated) lot. For example, "cleaning solution" of type "C-93475" is not limited to a particular lot number. The example fourth row 665 also indicates that the material item having part number "C-93475" is measured in "liters." The fourth row 665 also indicates a total volume of such material items are to be consumed in the setup of the SUE (e.g., 200 liters of cleaning solution).

While four example material entries are represented in the example bill of materials table 600 of FIG. 6, more or fewer materials may be represented in the example bill of materials table 600 corresponding to the many materials that may be consumed to produce the corresponding product.

FIG. 7 illustrates an example SU object status table 700 that may be stored in the example statuses data store 240 (FIG. 2) to store information identifying status of SU objects. The example SU object status table 700 of FIG. 7 includes an example object identifier column 705, an example verifying part number column 710, an example verifying lot number column 715, an example scanned part number column 720, an example scanned lot number column 725, an example port identifier column 730, an example port connection status column 735 and an example activation status column 740. The example object identifier column 705 indicates an identifier of an SU object. In the illustrated example, the object identifier column 705 is an alphanumeric string that uniquely identifies SU objects. For example, an object identifier value may be used to query (e.g., look-up, retrieve, etc.) characteristics for particular SU objects. However, any other approach uniquely identifying SU objects may additionally or alternatively be used.

The example verifying part number column 710 and the example verifying lot number column 715 identify component verifying information associated with a corresponding single-use component. The example verifying part number column 710 is an alphanumeric string that identifies a part number (or a model number) of a single-use component. The verifying part number values may be retrieved from the example equipment setup table 500 of FIG. 5. The example verifying lot number column 715 indicates a particular lot number to which the corresponding single-use component belongs. The verifying lot number values may be retrieved from the example bill of materials table 600 of FIG. 6.

The example scanned part number column 720 and the example scanned lot number column 725 identifies component identifying information retrieved (e.g., scanned) from a single-use component connected in the SUE. The example scanned part number column 720 is an alphanumeric string that identifies a part (or model) of a single-use device. The example scanned lot number column 725 indicates a particular lot number to which the corresponding single-use equipment belongs. In the illustrated example, the scanned part number value and the scanned lot number value are populated based on component identifying information retrieved (e.g., via scanning) from the single-use component in the SUE.

The example port identifier column 730 indicates one or more ports associated with the corresponding single-use component. For example, a transfer hose may have an input port (e.g., "TH1Port_A") and an output port (e.g., "TH1Port_B"). The example port connection status column 735 indicates a status of the corresponding port. For example, the port connection status may indicate whether a corresponding port is connected (e.g., the connection monitor 210 detects a physical connection) or is not connected (e.g., the connection monitor 210 does not detect a physical connection). The example activation status column 740 indicates whether the corresponding SU object is activated. In the illustrated example, the status of an SU object is activated when (1) all of the ports associated with the corresponding single-use component are connected (e.g., based on the values in the port connection status column 735), (2) the scanned part number value in the scanned part number column 720 is verified against the corresponding part number stored in the example verifying part number column 710, the example equipment setup data store 230 of FIG. 2 and/or the equipment setup table 500 of FIG. 5) and (3) the scanned lot number value stored in the scanned lot number column 725 is verified against the corresponding lot number value stored in the example verifying lot number column 715 and/or the example bill of materials table 600 of FIG. 6.

The example data table 700 of the illustrated example of FIG. 7 includes three example rows 750, 755, 760 corresponding to three example single-use object entries. The first example row 750 indicates that an SU object identified as object "SU_TH1" may be verified by part number "T-000201" and lot number "237925359." The first example row 750 also indicates that the single-use component corresponding to the SU object "SU_TH1" has a first port "TH1Port_A" that is connected (e.g., the connection monitor 210 detects a physical connection) to the appropriate clamp position, and a second port "TH1Port_B" that is not connected to the appropriate clamp position. Accordingly, the status of the object "SU_TH1" is indicated as "inactive." Additionally, because all ports of the SU object "SU_TH1" are not confirmed (e.g., not connected), the connection monitor 210 has not retrieved component identifying information from the single-use component in the SUE.

The second example row 755 indicates that an SU object identified as object "SU_MB1" may be verified by part number "B-200499" and lot number "907555555t." The example second row 755 also indicates that the single-use component corresponding to the SU object "SU_MB1" has four ports (e.g., a first port "MB1Port_A," a second port "MB1Port_B," a third port "MB1Port_C" and a fourth port "MB1Port_D") that are each connected to the appropriate clamp position. In the illustrated example, the equipment verifier 215 (1) verified the scanned part number "B-200499" of the corresponding object "SU_MB1" against the verifying part number value "B-200499" and (2) verified the scanned lot number "907555555t" of the corresponding object "SU_MB1" against the verifying lot number value "907555555t." Accordingly, the status of the SU object "SU_MB1" in the example SU object status table 700 is indicated as "active."

The third example row 760 indicates that an SU object identified as object "SU_P1" may be verified by part number "P393092" and that the corresponding single-use component is not required to be included in a particular lot. The example third row 760 also indicates that the single-use component corresponding to the SU object "SU_P1" has a first port "P1Port_A" that is connected (e.g., the connection monitor 210 detects a physical connection) to the appropriate clamp position, and a second port "P1Port_B" that is also connected to the appropriate clamp position. In the illustrated example, the equipment verifier 215 verified the scanned part number "P-393092" of the corresponding object "SU_P1" against the verifying part number value "P-393092." In the illustrated example, the single-use component corresponding to the SU object "SU_P1" is not required to be included in a pre-allocated lot. In some examples, the connection monitor 210 may discard the scanned lot number if the corresponding single-use component is not required to be included in a particular lot. In some examples, the connection monitor 210 may store a scanned lot number (if available), but disregard the value when performing the SU object activation test. Accordingly, the status of the object "SU_P1" in the example SU object status table 700 is indicated as "active."

While three example SU object status entries are represented in the example SU object status table 700 of FIG. 7, more or fewer SU objects may be represented in the example SU object status table 700 corresponding to the number of SU objects included in the control interface 207.

Figure 8:
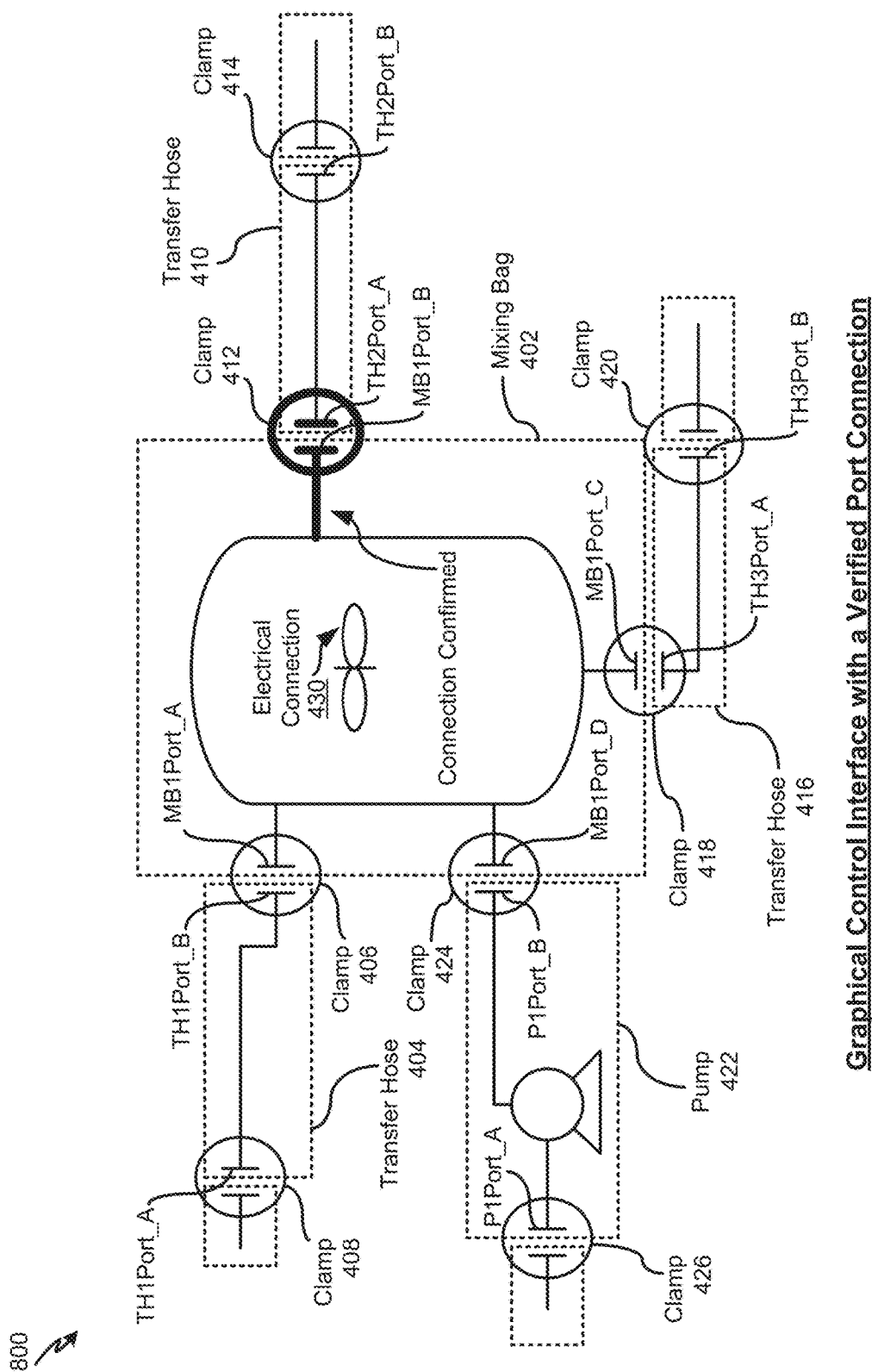
FIGS. 8-11 illustrate example control interfaces generated by the PAS platform of FIGS. 1 and/or 2.

FIGS. 8-11 illustrate the graphical control interface at different stages of the setup of the SUE. FIG. 8 illustrates an example graphical control interface 800. The example graphical control interface 800 of FIG. 8 represents the graphical control interface 400 of FIG. 4 including a verified port connection. In the illustrated example, the clamp 412 is confirmed to be in the closed position and engaging two components. For example, the left contact position of the clamp 412 is engaging the mixing bag port MB1Port_B and the right contact position of the clamp 412 is engaging the transfer hose port TH2Port_A. As described above in connection with the example PAS platform 140 of FIGS. 1 and/or 2, when the example connection monitor 210 detects a port connection, the connection monitor updates the port connection status of the corresponding object in the example SU object status table 700 of FIG. 7. The example connection monitor 210 also updates the graphical control interface displayed to the user to illustrate the verified port. In the illustrated example, when a port connection is verified, the port is represented by a bold line.

Figure 9:
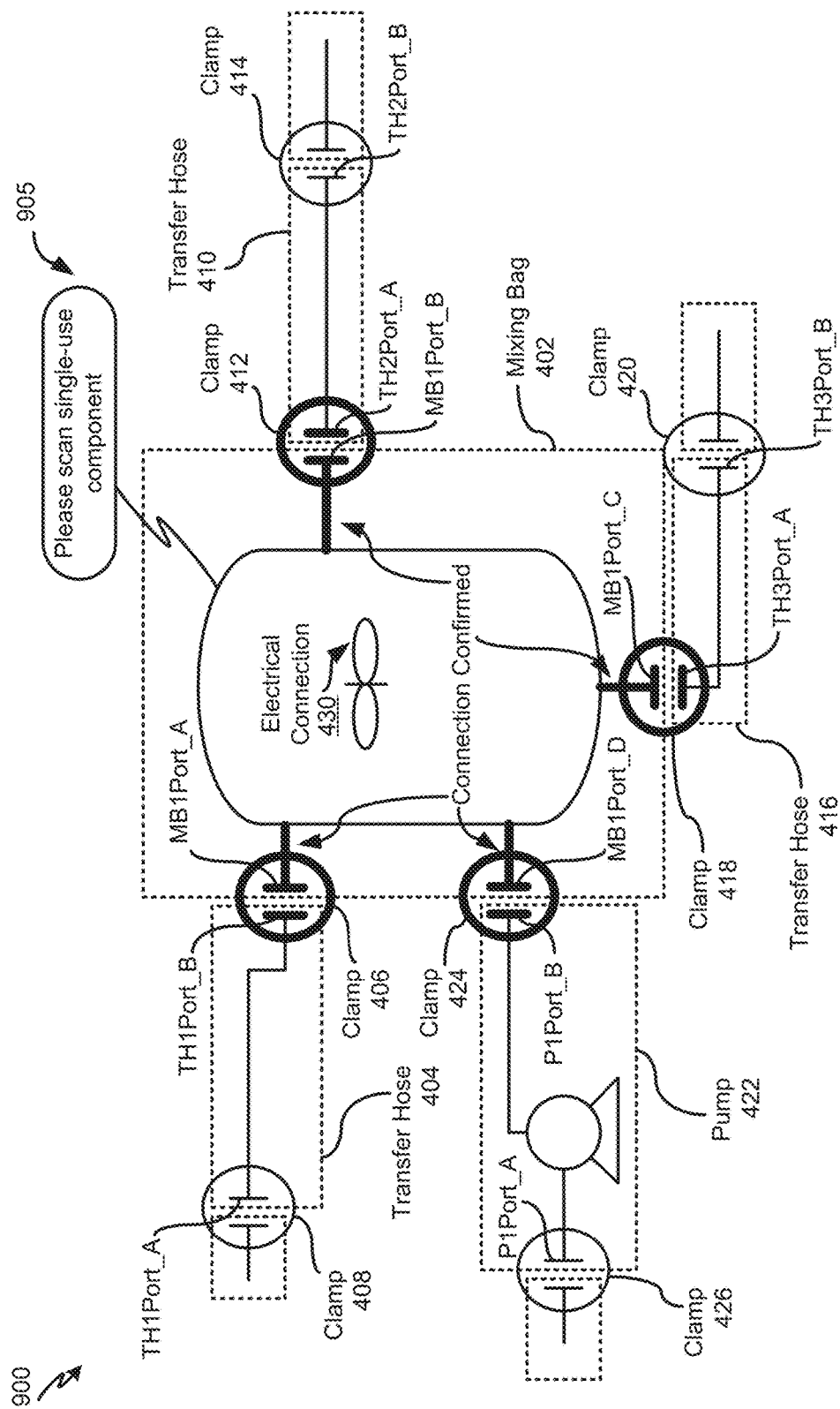

FIG. 9 illustrates an example graphical control interface 900. The example graphical control interface 900 of FIG. 9 represents the graphical control interface 400 of FIG. 4 including a request 905 to scan a single-use component. In the illustrated example, the example clamps 406, 412, 418, 424 connected to the ports of the example mixing bag 402 are confirmed to be in the closed-position and engaging two components. For example, the right contact position of the first clamp 406 is engaging the mixing bag port MB1Port_A and the left contact position of the first clamp 406 is engaging the transfer hose port TH1Port_B, the left contact position of the second clamp 412 is engaging the mixing bag port MB1Port_B and the right contact position of the second clamp 412 is engaging the transfer hose port TH2Port_A, the left contact position of the third clamp 418 is engaging the mixing bag port MB1Port_C and the right contact position of the third clamp 418 is engaging the transfer hose port TH3Port_A, and the right contact position of the fourth clamp 424 is engaging the mixing bag port MB1Port_D and the left contact position of the fourth clamp 424 is engaging the pump port P1Port_B. In the illustrated example, the engaged and verified port connections of the clamps 406, 412, 418, 424 are illustrated as bold lines. In response to determining that all of the ports of the mixing bag 402 are connected (e.g., the mixing bag ports MB1Port_A, MB1Port_B, MB1Port_C, MB1Port_D), the example connection monitor 210 prompts the user to scan the single-use component (e.g., the mixing bag 402).

Figure 10:
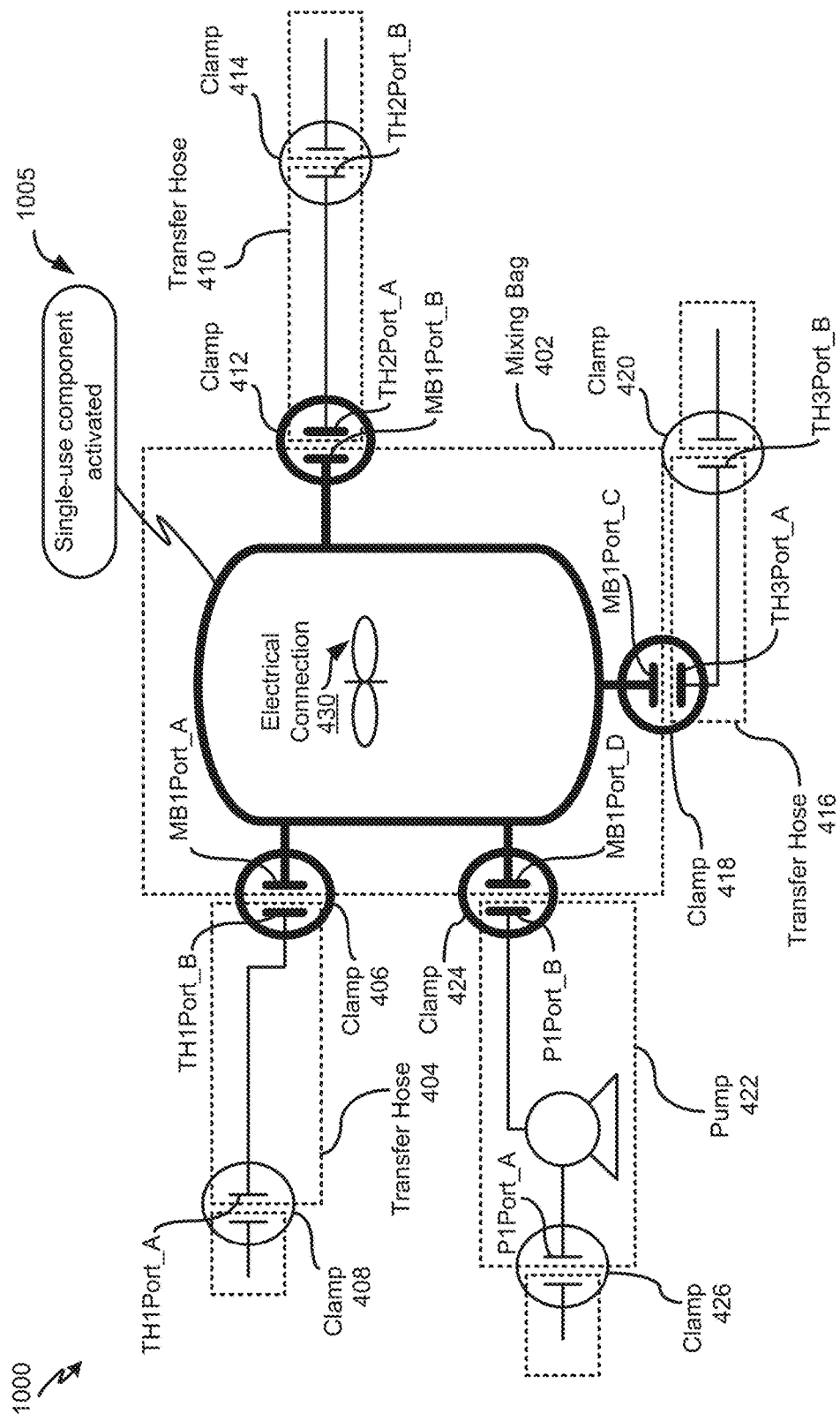

FIG. 10 illustrates an example graphical control interface 1000. The example graphical control interface 1000 of FIG. 10 represents the graphical control interface 400 of FIG. 4 including an activated SU object and a message 1005 identifying the activated SU object (e.g., the mixing bag 402). In the illustrated example, the activated SU object is represented by bold lines. As described above, the PAS platform 140 determines to activate an SU object when (1) all of the ports of the single-use component are connected and (2) the scanned part number matches the verifying part number for the single-use component. In some examples, when the single-use component is associated with a pre-allocated lot number, the PAS platform 140 also performs a check to confirm that the scanned lot number from the single-use component matches the verifying lot number associated with the single-use component in the example equipment setup table 700 of FIG. 7.

Figure 11:
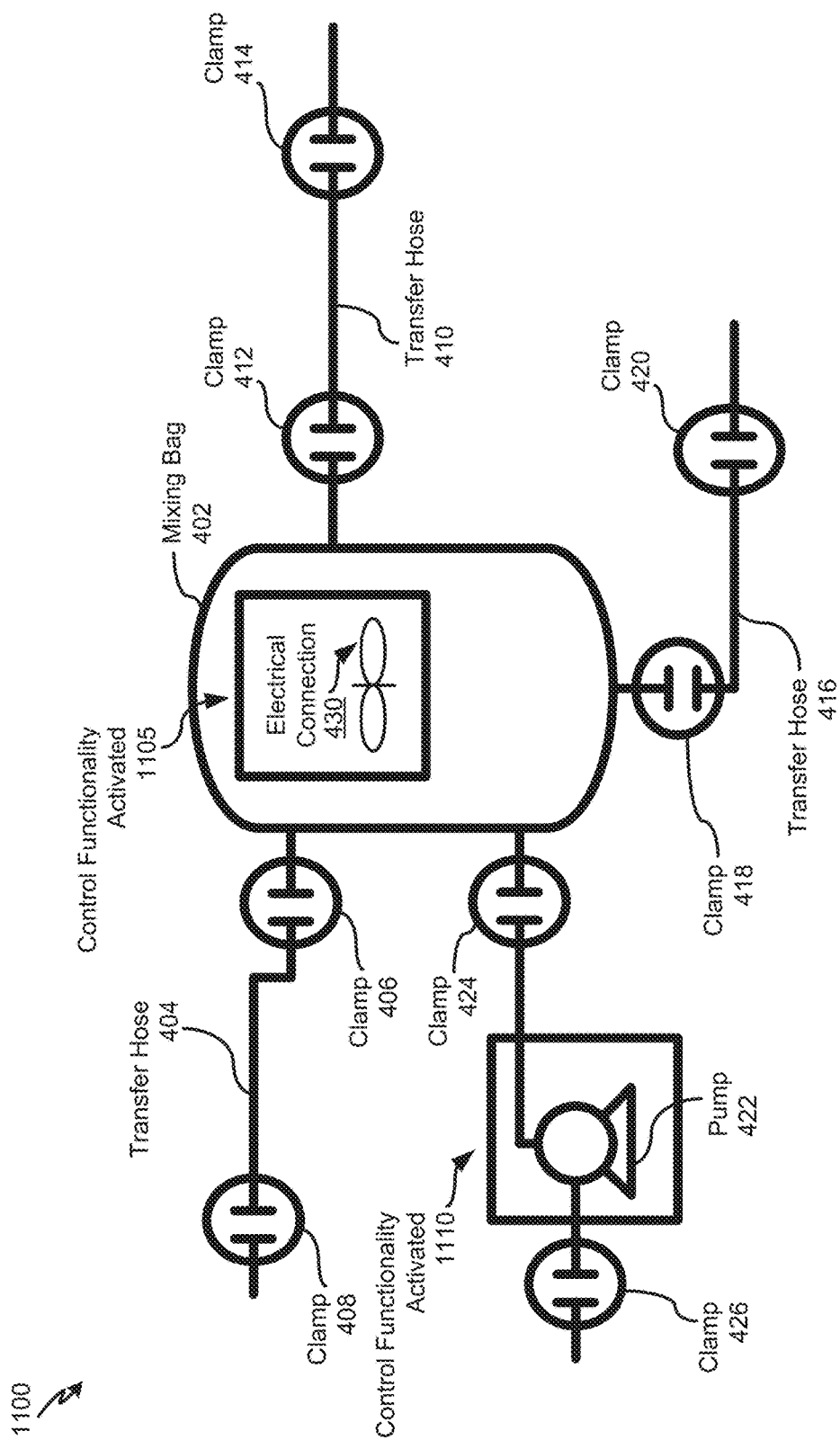

FIG. 11 illustrates an example graphical control interface 1100. The example graphical control interface 1100 of FIG. 11 represents an activated graphical control interface. The graphical control interface 1100 is activated when all the SU objects in the control interface 207 are activated and the electrical connections are confirmed. In the illustrated example, the confirmed electrical connections are indicated via bold boxes 1105, 1110. For example, the electrical connection 430 of the mixing bag 402 is identified by the first bold box 1105 and an electrical connection of the port 422 is identified by the second bold box 1110. For clarity, the port identifiers are not shown in the graphical control interface 1100.

Figure 12:
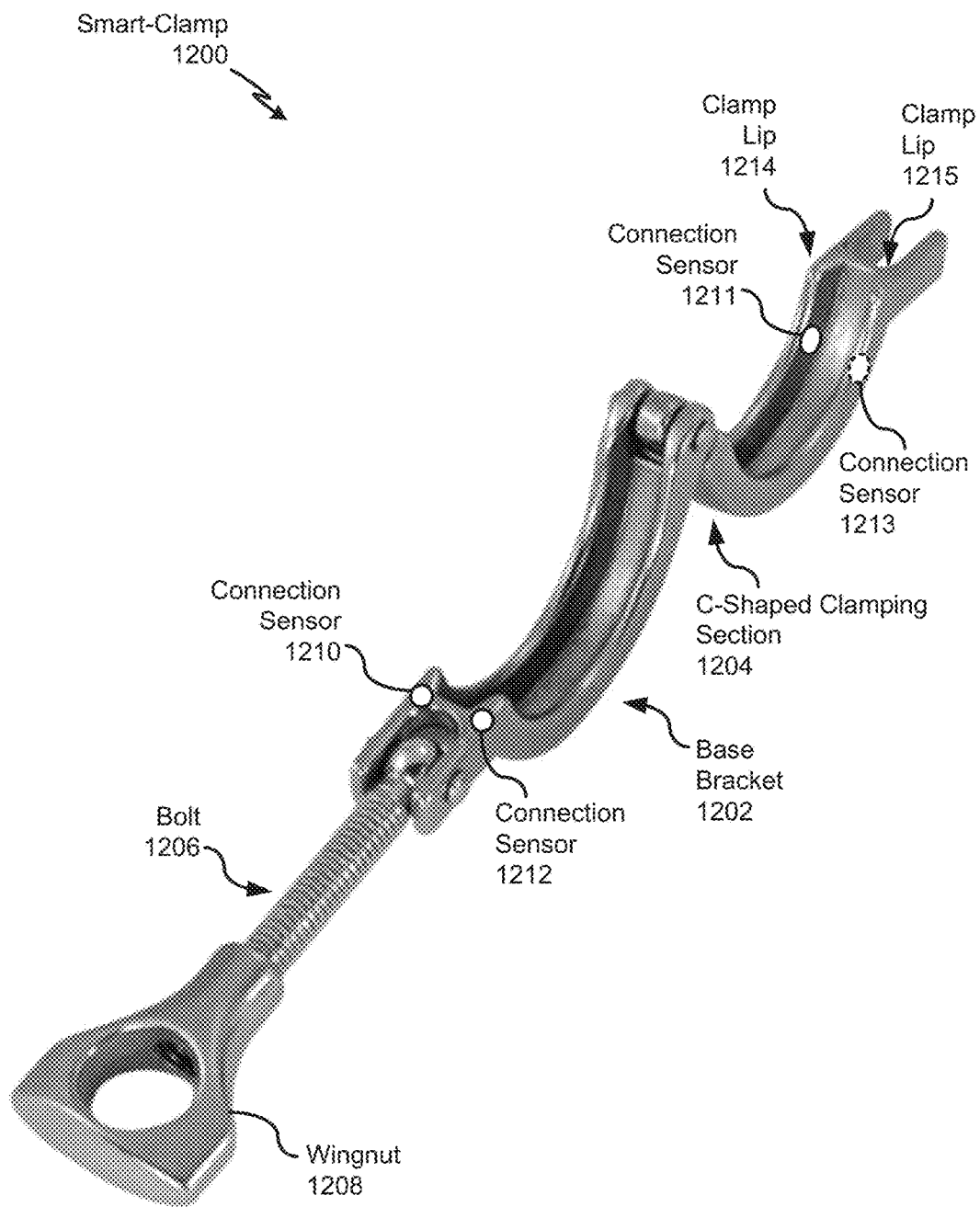
FIG. 12 illustrates an example smart-clamp that may be used to implement the teachings of this disclosure.

FIG. 12 illustrates an example smart-clamp 1200 described herein. The example smart-clamp 1200 of FIG. 12 is a tri-clamp clamping system. Although the example smart-clamp 1200 of FIG. 12 is a tri-clamp, other types of clamps may additionally or alternatively be used. The smart-clamp 1200 of FIG. 12 includes an example base bracket 1202 pivotally coupled to an example c-shaped clamping section 1204. The example base bracket 1202 is also coupled to an example bolt 1206. In the illustrated example, the bolt 1206 is threadably coupled to an example wingnut 1208 that may be used to tighten or loosen the smart-clamp 1200. Additionally, while the example bolt 1206 of FIG. 12 is coupled to the example wingnut 1208, other types of fasteners may additionally or alternatively be used to fasten the smart-clamp 1200.

The example smart-clamp 1200 also includes example connection sensors 1210-1213 (e.g., proximity sensors) embedded in the example base bracket 1202 and the example c-shaped clamping section 1204. In the illustrated example, the base bracket 1202 is embedded with example connection sensors 1210, 1212. The example c-shaped clamping section 1204 is embedded with example connection sensors 1211, 1213.

In the illustrated example of FIG. 12, the example connection sensor 1211 is embedded in a first clamp lip 1214 of the c-shaped clamping section 1204 and the example connection sensor 1213 is embedded in a second clamp lip 1215 of the c-shaped clamping section 1204. As described above, the example connection monitor 210 of FIG. 2 may utilize values from the connection sensors 1210-1213 to detect when the smart-clamp 1200 is in an open-position (shown in FIG. 12) or in a closed-position. For example, when the connection sensors 1210, 1212 of the base bracket 1202 are in contact with (or nearly in contact with (e.g., are proximal to)) the connection sensors 1211, 1213 of the c-shaped clamping section 1204, the connection monitor 210 may process the outputs provided by the connection sensors 1210-1213 and determine that the smart-clamp 1200 is in the closed-position. Alternatively, when the connection sensors 1210, 1212 of the base bracket 1202 are not in contact with the connection 1211, 1213 of the c-shaped clamping section 1204 and/or are not proximate to the connection sensors 1211, 1213, the connection monitor 210 may process the outputs provided by the connection sensors 1210-1213 and determine that the smart-clamp 1200 is in the open-position.

In addition, based on the outputs provided by the connection sensors 1210-1213, the example connection monitor 210 may determine the smart-clamp 1200 is in a non-engaged state (e.g., outputs from all four connection sensors 1210-1213 indicate they are not in contact with and/or not proximate to a component), or that the smart-clamp 1200 is in a fully-engaged state (e.g., outputs from all four connection sensors 1210-1213 indicate that they are in contact with and/or proximate to a component). Accordingly, outputs from the smart-clamp 1200 may be used to determine whether both contact positions of the smart-clamp 1200 are connected, or neither contact position of the smart-clamp 1200 is connected.

In some examples, when the connection sensors 1210-1213 are engaged, the sensors 1210-1213 automatically collect information regarding the component to which it is coupled. For example, the connection sensors 1210-1213 may determine the single-use component identifying information (e.g., a part number, a lot number, a model number, etc.) and/or collect the component identifying information. In some examples, the connection sensors 1210-1213 collect the above-noted component identifying information via a radio frequency identification (RFID) device (e.g., a tag) affixed to the single-use component. In other examples, the connection sensors 1210-1213 may collect the component identifying information via a barcode reading device or via Bluetooth®. The connection sensors 1210-1213 may communicate the component identifying information from the smart-clamp 1200 to the example connection monitor 210 via the example data buses 110 of FIG. 1 and/or a wireless connection. Additionally or alternatively, in some instances, a user (e.g., an operator) may input the component identifying information directly to the connection monitor 210 via, for example, an input interface (e.g., a keyboard, a handheld device, etc.) associated with the example workstation 102 of FIG. 1.

Although the example smart-clamp 1200 of FIG. 12 includes two connection sensors 1210, 1212 embedded in the base bracket 1202 and two connection sensors 1211, 1213 embedded in the c-shaped clamping section 1204, any other number of sensors may additionally or alternatively be used. For example, the smart-clamp 1200 may include zero, one, two, etc. connection sensors embedded in the base bracket 1202 and/or may include zero, one, two, etc. connection sensors embedded in the c-shaped clamping section 1204.

In the illustrated example, the connection sensors 1210-1213 provide proximity detection, engagement detection, information collection and network connectivity. However, these features may be split among any number of sensors. For example, first and second connection sensors 1210, 1212 may be contact sensors (e.g., magnetic sensors) that detect when the smart-clamp 1200 is in a closed-position or in an open position. The example third and fourth sensors 1211, 1213 may detect when the smart-clamp 1200 is in a non-engaged state (e.g., neither the second sensor nor the third sensor is engaged), a partially-engaged state (e.g., either the second sensor or the third sensor is engaged) or a fully-engaged state (e.g., both the second sensor and the third sensor are engaged). One or more of the connection sensors 1210-1213 may read component identifying information from a component fastened by the smart-clamp 1200. Furthermore, network connectivity may be implemented by a communication device coupled to the smart-clamp 1200.

Although the example smart-clamp 1200 of FIG. 12 facilitates fastening two interchangeable components, in some instances, one of the components may be affixed (e.g., permanently affixed) to the smart-clamp 1200. For example, an input/output port of a stainless steel drum may be permanently affixed to one contact position of the smart-clamp 1200 (e.g., the right contact position of the smart-clamp 1200 is connected). In some such instances, the example connection sensors 1212, 1213 may continuously indicate an engaged state, while the status of the connection sensors 1210, 1211 may vary based on the presence of a second component. In other instances, the smart-clamp 1200 may not include the connection sensors 1212, 1213 and include the connection sensors 1210, 1211. In some such instances, rather than identifying the smart-clamp 1200 as one of three possible engagement states (e.g., a non-engaged state, a partially-engaged state and a fully-engaged state), the example connection monitor 210 may identify the smart-clamp 1200 as one of two possible engagement states (e.g., a partially-engaged state or a fully-engaged state) based on the signal received from the smart-clamp 1200.

Figure 13:
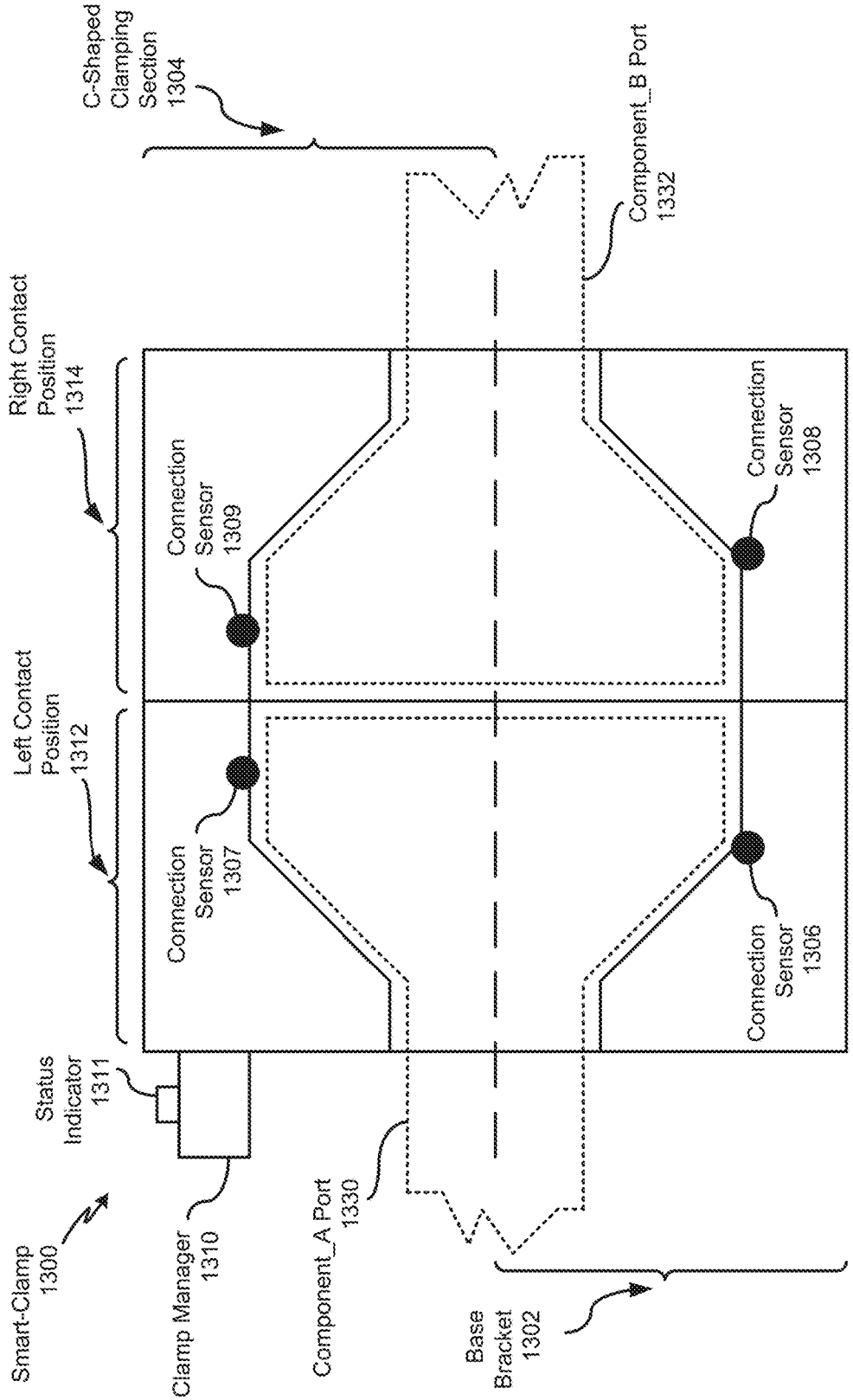
FIG. 13 illustrates another example smart-clamp that may be used to implement the teachings of this disclosure.

FIG. 13 illustrates a cross-sectional view of another example smart-clamp 1300. The example smart-clamp 1300 of FIG. 13 is illustrated in the closed-position and is clamping a first port 1330 of a first single-use component Component_A and a second port 1332 of a second single-use component Component_B. The example smart-clamp 1300 includes an example base bracket 1302 pivotally coupled to an example c-shaped clamping section 1304. In the illustrated example of FIG. 13, example connection sensors 1306, 1308 are embedded in the base bracket 1302 and example connection sensors 1307, 1309 are embedded in the c-shaped clamping section 1304. One or more of the connection sensors 1306-1309 detect when the smart-clamp 1300 is in a closed-position or in an open position. The example connection sensors 1306-1309 of FIG. 13 also detect when the smart-clamp 1300 is in a fully-engaged state (e.g., both contact positions 1312, 1314 are in the closed-position and clamping respective ports) or in a non-engaged state (e.g., the contact positions 1312, 1314 are either in the open-position or are not clamping a port).

In the illustrated example of FIG. 13, the smart-clamp 1300 includes an example clamp manager 1310. The example clamp manager 1310 monitors outputs from the connection sensors 1306-1309 and determines when a contact position is engaged. In the illustrated example, the clamp manager 1310 transmits a signal to the connection monitor 210 of FIG. 2 when a contact position is engaged. In some examples, the clamp manager 1310 may include clamp identifying information in the signal. For example, the clamp manager 1310 may include a clamp identifier identifying the smart-clamp 1300 and a value indicative of which contact position of the smart-clamp 1300 (e.g., the left contact position 1312 and/or the right contact position 1314) is engaged. As described above, the connection monitor 210 may use the clamp identifying information and the equipment setup table 500 of FIG. 5 to determine whether the correct clamp is connected to the correct port and/or when the ports of the corresponding single-use component are connected.

In some examples, the clamp manager 1310 may cause one or more of the connection sensors 1306-1309 to read component identifying information (e.g., a part number, a lot number, a model number, etc.). For example, the clamp manager 1310 may receive a request from the connection monitor 210 to retrieve component identifying information. In some such instances, the clamp manager 1310 may cause an appropriate connection sensor to perform a scan of the connected port for component identifying information. For example, the clamp manager 1310 may cause the connection sensors 1306, 1307 to scan the port 1330 for component identifying information if, for example, the connection monitor 210 sends a request requesting component identifying information associated with the single-use component Component_A (e.g., the connection monitor 210 may determine that the ports of the single-use component Component_A are all connected).

In the illustrated example of FIG. 13, the example smart-clamp 1300 includes an example status indicator 1311 (e.g., a light emitting diode (LED)). The status indicator 1311 indicates a status of the smart-clamp 1300. For example, the smart indicator 1311 may output a red color when the smart-clamp 1300 is in an open-position and may output a yellow color when the smart-clamp 1300 is in the closed-position. When the smart-clamp 1300 is in a closed-position and in a fully-engaged state, the smart indicator 1311 may output a green color. For example, in response to a signal from the PAS system 140 indicating that the control interface is fully activated, the clamp manager 1310 may cause the smart indicator 1311 to output a green color. Additionally or alternatively, in response to a request for component identifying information, the clamp manager 1310 may prompt a user to scan the single-use component Component_A. For example, the clamp manager 1310 may cause the status indicator 1311 to flash when a request to scan for component identifying information is received. In some examples, the smart-clamp 1300 may be provided an LED for each contact position 1312, 1313 to identify which single-use component to scan.

Figure 14:
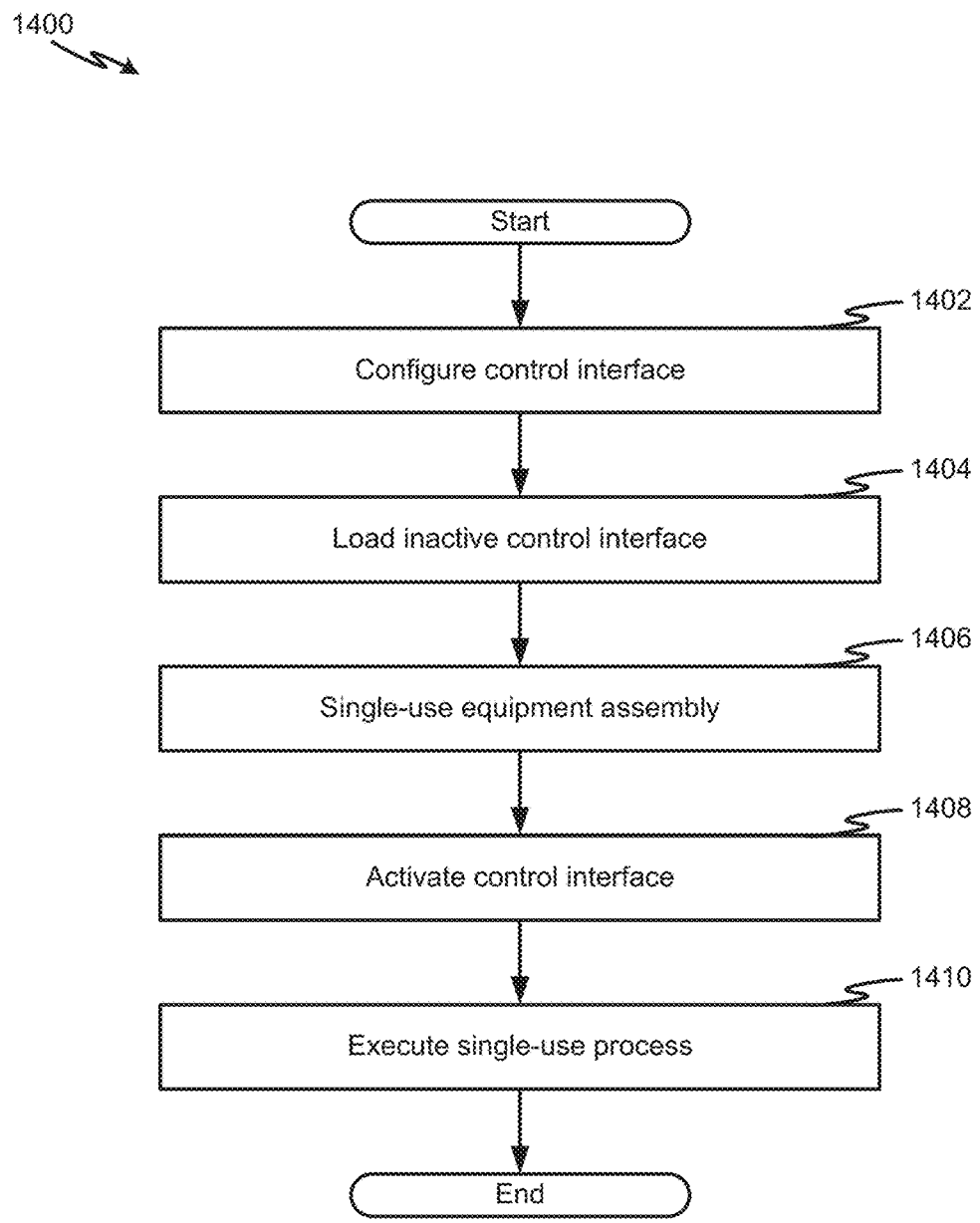
FIG. 14 is a flowchart representative of an example method that may be executed to automate a single-use equipment/process verification system.

A flowchart representative of an example method for automating an SUE verification system is shown in FIG. 14. Flowcharts representative of example methods for implementing the PAS platform 140 of FIGS. 1 and/or 2 are shown in FIGS. 15-18. A flowchart representative of an example method for implementing the clamp manager 1310 of FIG. 13 is shown in FIG. 19. In these examples, the methods may be implemented using machine readable instructions that comprise a program for execution by a processor such as the processor 2012 shown in the example processor platform 2000 discussed below in connection with FIG. 20. The program(s) may be embodied in software stored on a tangible computer readable storage medium such as a CD-ROM, a floppy disk, a hard drive, a digital versatile disk (DVD), a Blu-ray disk, or a memory associated with the processor 2012, but the entire program(s) and/or parts thereof could alternatively be executed by a device other than the processor 2012 and/or embodied in firmware or dedicated hardware. Further, although the example program(s) is/are described with reference to the flowcharts illustrated in FIGS. 14-19, many other methods of automating an SUE verification system, implementing the example PAS platform 140 and/or implementing the example clamp manager 1310 may alternatively be used. For example, the order of execution of the blocks may be changed, and/or some of the blocks described may be changed, eliminated, or combined.

As mentioned above, the example methods of FIGS. 14-19 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 14-19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 14 is a flowchart representative of an example method 1400 that may be executed to implement the example PAS platform 140 of FIGS. 1 and/or 2 to setup an SUE. The method 1400 of FIG. 14 begins at block 1402 when a user (e.g., an automation engineer) uses the PAS platform 140 to configure a graphical control interface. For example, the example configuration manager 205 (FIG. 2) may guide a user through designing the example graphical control interface 400 (FIG. 4) and configuring the example equipment setup table 500 (FIG. 5). An example implementation of block 1402 is described below in conjunction with FIG. 15.

At block 1404, the PAS platform 140 loads the inactive control interface 400 to enable setup of the SUE. For example, the PAS platform 140 may provide an operation interface to the user and retrieve the graphical control interface 400 of FIG. 4 from the example control interfaces data store 240 (FIG. 2).

At block 1406, the PAS platform 140 facilitates assembling the single-use equipment/process(es). For example, the graphical control interface may guide an operator in physically connecting single-use components and verifying that the correct single-use components are connected. An example implementation of block 1406 is described below in conjunction with FIG. 16. Alternatively, other operations that may facilitate assembling single-use equipment/process(es) may be utilized.

At block 1408, the example PAS platform 140 activates the graphical control interface. For example, the PAS platform 140 may determine that all SU objects in the control interface are activated and that the connections (e.g., electrical connections, flowpath connections, etc.) are confirmed. In the illustrated example, the operation of block 1408 is implemented using the method of FIG. 17. Alternatively, other operations that may enable activating the control interface may be utilized.

At block 1410, the example PAS platform 140 facilitates executing the SUE. For example, the PAS platform 140 may enable the operator to execute a batch to produce a product. In the illustrated example, the operation of block 1410 may involve using the method of FIG. 18. Alternatively, other operations that may facilitate executing the SUE may be utilized. The example method 1400 of FIG. 14 then ends.

Figure 15:
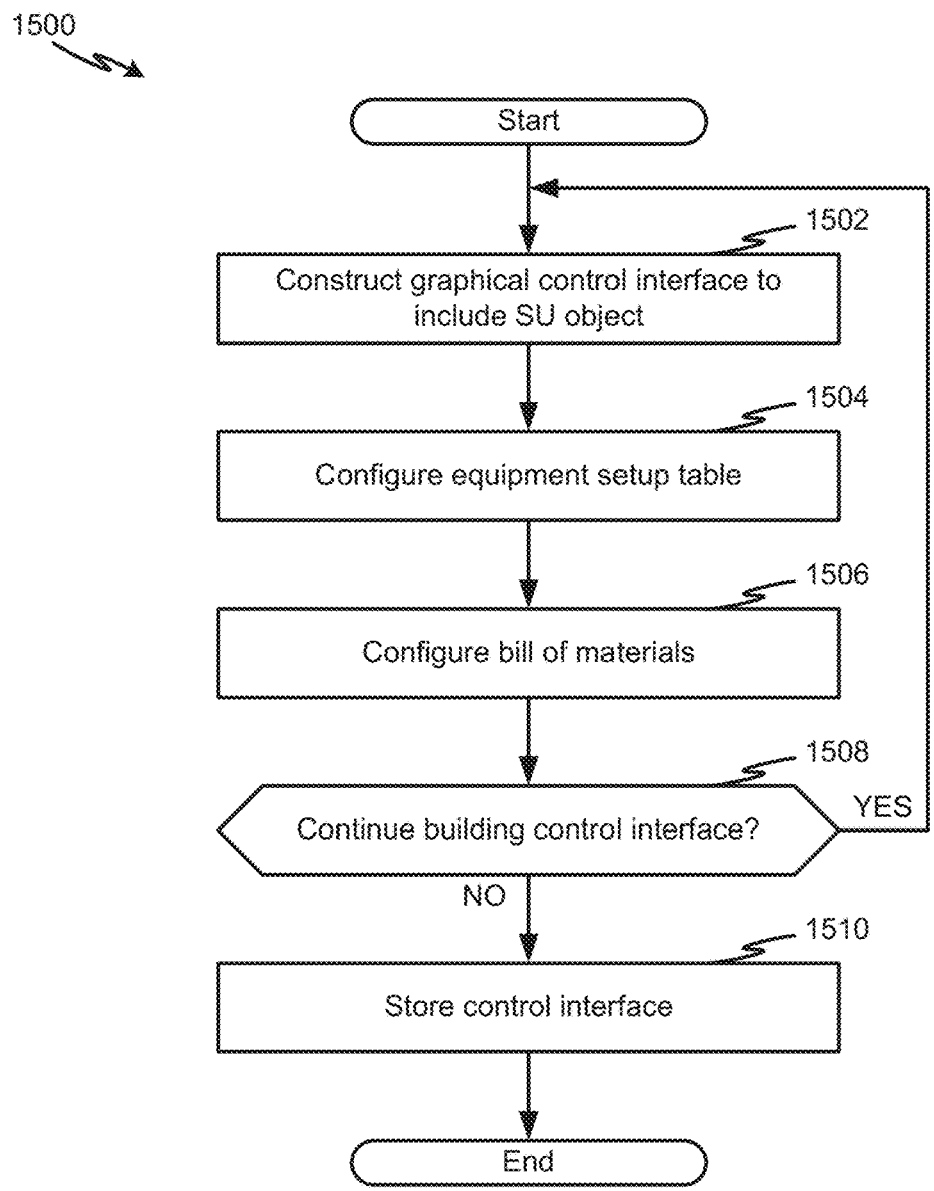
FIGS. 15-18 are flowcharts representative of example methods that may be executed by the example PAS platform of FIGS. 1 and/or 2 to set up single-use equipment/process(es).

FIG. 15 is a flowchart representative of an example method 1500 that may be executed to implement the example PAS platform 140 of FIGS. 1 and/or 2 to setup the process control system 104. The example method 1500 of FIG. 15 may be used to implement block 1402 of FIG. 14 to configure a control interface. The method 1500 of FIG. 15 begins at block 1502 when the example configuration manager 205 (FIG. 2) facilitates constructing a graphical control interface representative of the SUE by creating SU objects representative of single-use components. For example, the configuration manager 205 may provide a configuration interface that a user may use to build the example graphical controls interface 400 of FIG. 4 based on a process flow diagram (PFD) representing the flow of materials and a piping and instrumentation drawing/diagram (PID) representing the connections of the instruments in the PFD. In some examples, the configuration manager 205 populates an SU object related to the corresponding SU object class. For example, the configuration manager 205 may instantiate the SU object 300 (FIG. 3) and populate the object ID field 305 of the object with a unique object identifier.

At block 1504, the configuration manager 205 configures the equipment setup table. For example, the configuration manager 205 may generate the example equipment setup table 500 of FIG. 5 based on the SU objects added to the graphical control interface. In some examples, the configuration manager 205 may prompt the user to define characteristics of the single-use components. For example, the configuration manager 205 may request the user provide a part number and assign a port identifier-clamp identifier mapping to a contact position of the clamp. In the illustrated example, the equipment setup table 500 is stored in the example equipment setup data store 230 (FIG. 2). An example implementation of the equipment setup table is described above in connection with the example equipment setup table 500 of FIG. 5.

At block 1506, the configuration manager 205 configures the bill of materials. For example, the configuration manager 205 may establish a connection with the bill of materials 132 from the MES platform 130 (FIG. 1). The bill of materials 132 represents a relationship between items and what materials are needed to produce a desired product. In the illustrated example, the bill of materials 132 enables verifying single-use components used in the SUE are the correct components. An example implementation of a bill of materials is described above in connection with the example bill of materials table 600 of FIG. 6.

At block 1508, the example PAS platform 140 determines whether to continue building the control interface. If, at block 1508, the PAS platform 140 determines to continue building the control interface (e.g., a new module is added to the process control system, etc.), controls returns to block 1502. If, at block 1508, the example PAS platform 140 determines to not continue building the control interface (e.g., receives a termination request), then, at block 1510, the PAS platform 140 stores the control interface in the example control interfaces data store 240 (FIG. 2). The example method 1500 of FIG. 15 then ends.

Figure 16:
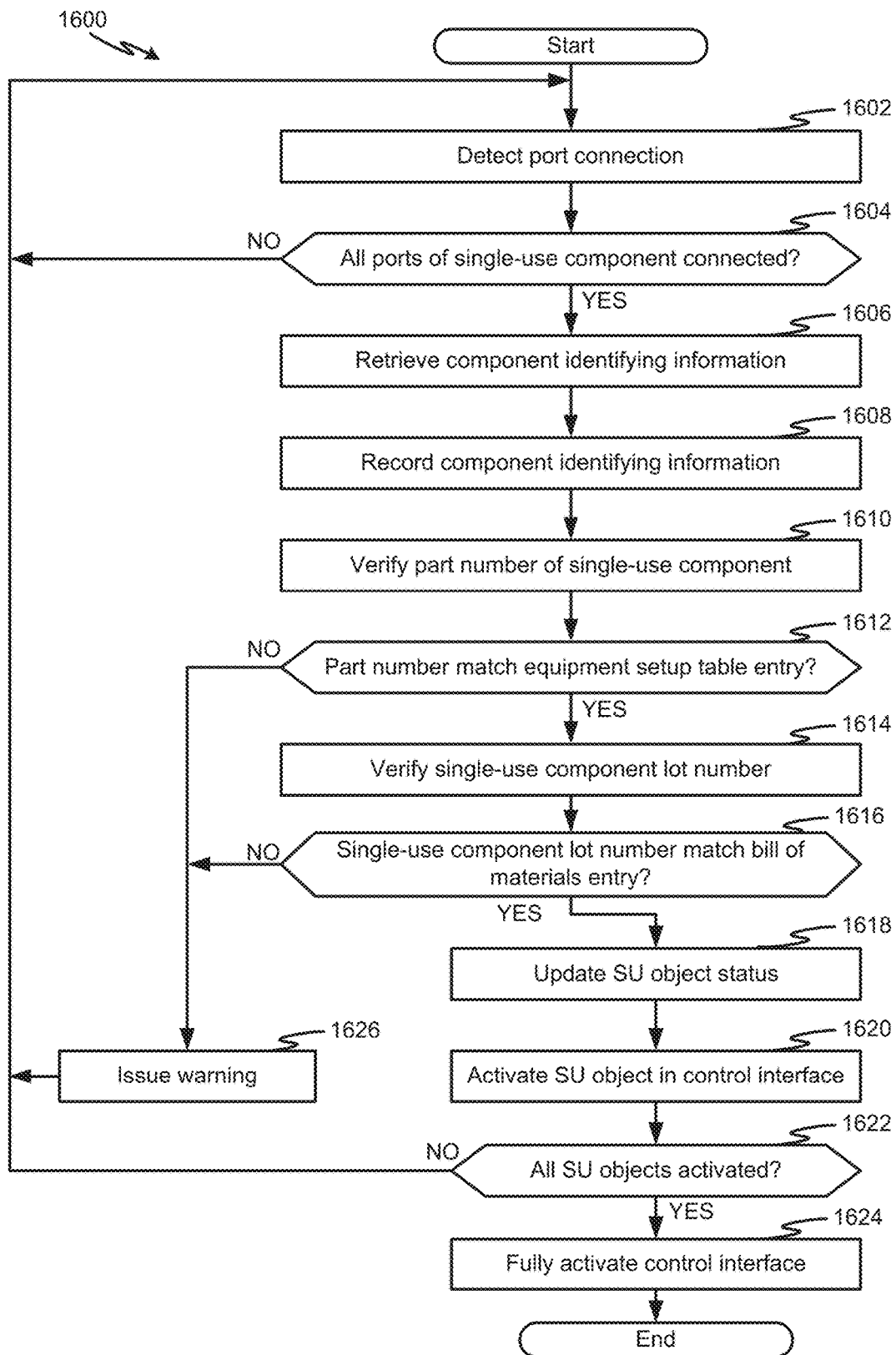

FIG. 16 is a flowchart representative of an example method 1600 that may be executed to implement the example PAS platform 140 of FIGS. 1 and/or 2. The example method 1600 of FIG. 16 may be used to implement block 1406 of FIG. 14 to facilitate single-use equipment/process(es) assembly. The method 1600 of FIG. 16 begins at block 1602 when the PAS platform 140 detects a port connection. For example, the example connection monitor 210 (FIG. 2) may receive a signal from the clamp manager 1310 of FIG. 13 indicating the corresponding clamp is in the closed-position and that a port is connected.

At block 1604, the example PAS platform 140 determines whether all ports of the single-use component are connected. For example, the connection monitor 210 may query the example SU objects status table 700 of FIG. 7 to determine whether all ports of the corresponding single-use component are connected. If, at block 1604, the example connection monitor 210 determines that all ports of the single-use component are not connected, then control returns to block 1602 to detect another port connection.

If, at block 1604, the example connection monitor 210 determines that all ports associated with the single-use component are connected, then, at block 1606, the example connection monitor 210 retrieves component identifying information from the single-use component. For example, the connection monitor 210 may prompt a user to scan a bar code affixed to the single-use component. At block 1608, the example connection monitor 210 records the component identifying information. For example, the connection monitor 210 may update the part number value 310 and the lot number value 315 of the SU object 300 (FIG. 3) corresponding to the single-use component.

At block 1610, the example PAS platform 140 verifies the connected single-use component. For example, the component verifier 215 (FIG. 2) may compare the scanned part number value recorded in the part number field 310 of the SU object 300 to the verifying part number value stored in the equipment setup table 500. In some examples, the component verifier 215 may use the object identifier value to map the SU object to the correct single-use component entry in the equipment setup table 500. If, at block 1612, the component verifier 215 determines that the part number 310 recorded in the SU object 300 does not match the verifying part number value stored in the equipment setup table 500, control proceeds to block 1626 to issue a warning. For example, the component verifier 215 may display an alert identifying the part number mismatch. Control then returns to block 1602 to wait to detect another port connection.

If, at block 1612, the component verifier 215 determines that the scanned part number value 310 matches the verifying part number value stored in the equipment setup table 500, then, at block 1614, the example component verifier 215 verifies the lot number of the single-use component. For example, the component verifier 215 may compare the scanned lot number value recorded in the lot number field 315 of the SU object 300 to the verifying lot number value stored in the bill of materials table 600. In some examples, the component verifier 215 may use the part number values to map the SU object to the correct single-use component entry in the bill of materials table 600. If, at block 1616, the component verifier 215 determines that the lot number value 315 does not match the verifying lot number value stored in the bill of materials table 600, control proceeds to block 1626 and a warning is issued. For example, the component verifier 215 may display an alert identifying the lot number mismatch. Control then returns to block 1602 to wait for another port connection.

If, at block 1616, the component verifier 215 determines that the lot number value 315 does match the verifying lot number value stored in the bill of materials table 600, or if the bill of materials table 600 did not require the corresponding single-use component to be included in a pre-allocated lot (e.g., an unavailable lot number), then at block 1618, the example component verifier 215 updates the status of the SU object. For example, the component verifier 215 may update the activation status value 320 of the SU object 300. Additionally or alternatively, the example component verifier 215 may update the status of the corresponding SU object in the example SU objects status table 700 (FIG. 7). For example, the component verifier 215 may update the status stored in the activation status column 730 of the corresponding single object from "inactive" status to "active" status.

At block 1620, the example component verifier 215 activates the SU object in the control interface. For example, the component verifier 215 may transition the SU object displayed in the control interface from a first image (e.g., thin lines) representative of an inactive state to a second image (e.g., bold lines) representative of an active state, as shown in the example control interface 1000 of FIG. 10. At block 1622, the example component verifier 215 determines whether all SU objects representative of the SUE are activated. For example, the component verifier 215 may parse the SI objects status table 700 of FIG. 7 to determine if any SU objects are identified as "inactive."

If, at block 1622, the component verifier 215 determines that all the SU objects in the control interface are not activated, then control returns to block 1602 to wait to detect another port connection. Otherwise, if, at block 1622, the component verifier 215 determines that all SU objects in the control interface are activated, then at block 1624, the component verifier 215 fully activates the control interface (e.g., activate electrical connections, etc.), as shown in the example control interface 1100 of FIG. 11. The example method 1600 of FIG. 16 then ends.

Figure 17:
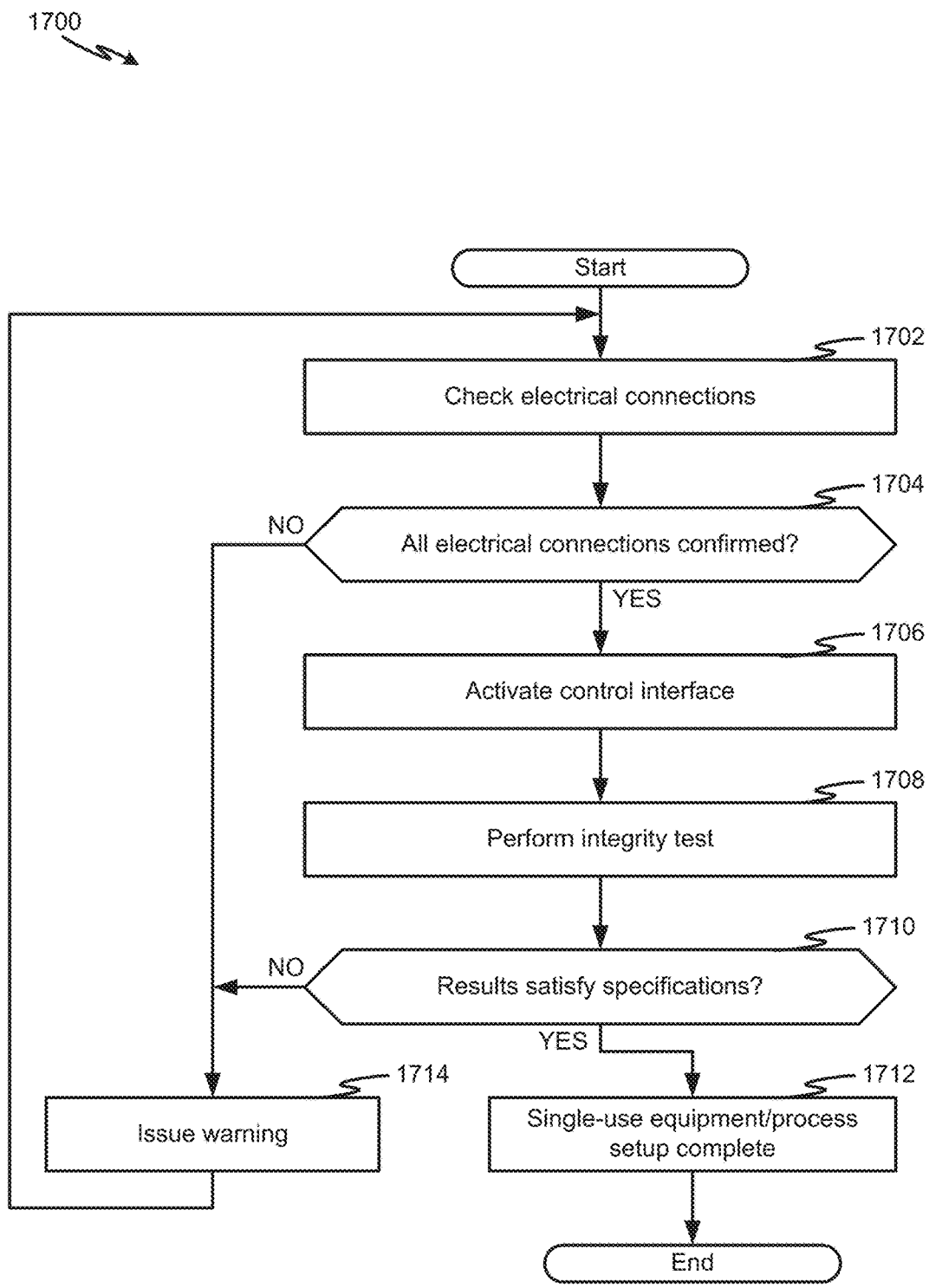

FIG. 17 is a flowchart representative of an example method 1700 that may be executed to implement the example PAS platform 140 of FIGS. 1 and/or 2. The example method 1700 of FIG. 17 may be used to implement block 1408 of FIG. 14 to facilitate activating the control interface when all SU objects in the control interface are activated. The method 1700 of FIG. 17 begins at block 1702 when the example PAS platform 140 checks electrical connections. For example, the example setup tester 220 (FIG. 2) may determine whether the SU objects in the control interface include an electrical connection and/or other input/outputs. For example, the setup tester 220 may check whether the single-use component corresponding to the SU object is connected to a power supply. If, at block 1704, the setup tester 220 is unable to confirm the electrical connections, control proceeds to block 1714 and the setup tester 220 issues a warning. For example, the setup tester 220 may present an alert indicating that all electrical connections were not confirmed. In some examples, the setup tester 220 may identify the SU object(s) that did not satisfy the electrical connections test. Control then returns to block 1702 to check electrical connections.

If, at block 1704, the setup tester 220 confirms the electrical connections, then, at block 1706, the example setup tester 220 activates the control interface. For example, the setup tester 220 may transition the control interface from the example control interface 1000 of FIG. 10 that includes one or more activated SU objects to the example control interface 1100 of FIG. 11. At block 1708, the example setup tester 220 performs an integrity test. For example, the setup tester 220 may check the pressure hold and/or measure the mass of air and/or water required to fill the system (e.g., to a specified pressure). If, at block 1710, the setup tester 220 determines that the results of the integrity test do not satisfy specified thresholds, control proceeds to block 1714 and the setup tester 220 issues a warning. For example, the setup tester 220 may present an alert indicating that the results of the integrity test failed to satisfy the specifications (e.g., acceptable threshold values). Control then returns to block 1702 to check electrical connections.

If, at block 1710, the setup tester 220 determines that the results of the integrity test do satisfy the specifications, then, at block 1712, setup of the SUE is complete. For example, the setup tester 220 may present a message indicating that the SUE is ready for executing a batch. The example program 1700 of FIG. 17 then ends.

Figure 18:
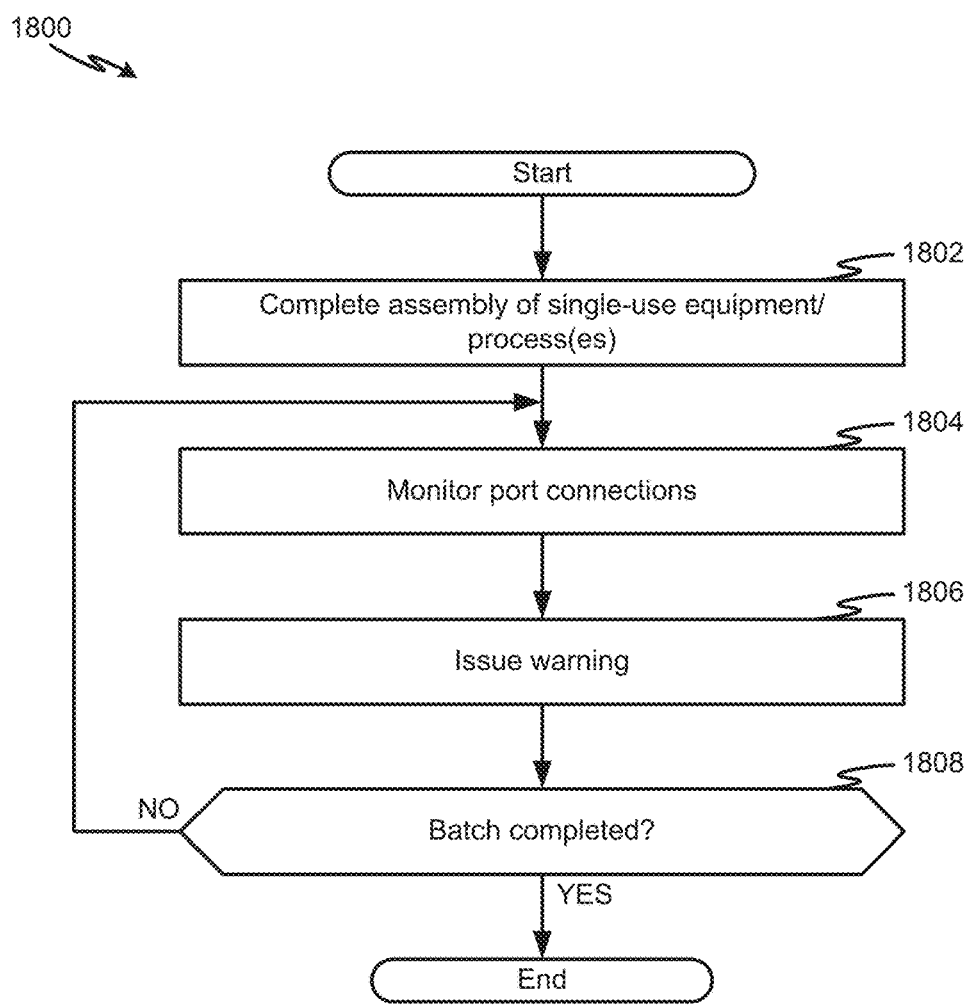
Figure 19:
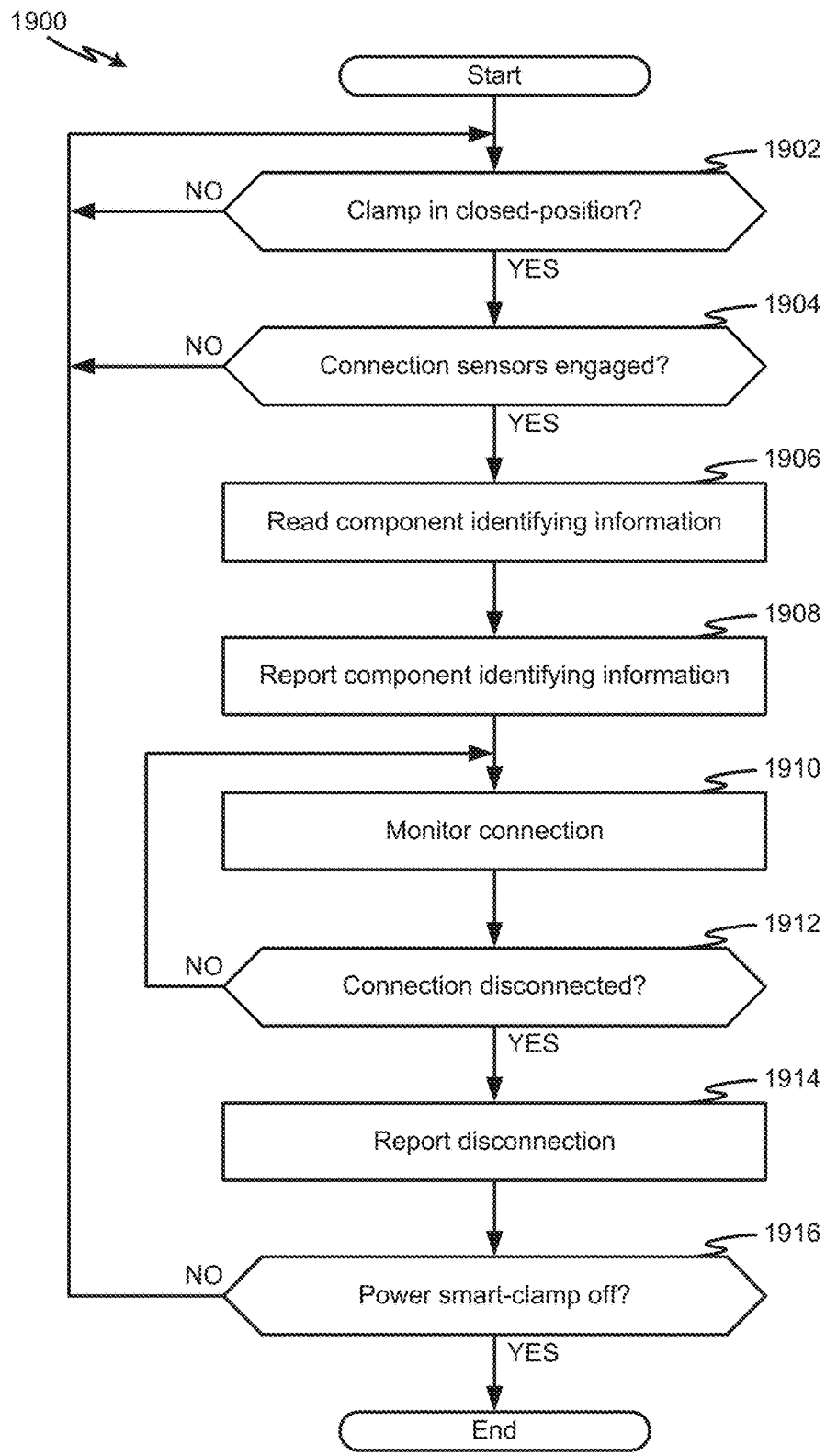
FIG. 19 is a flowchart representative of an example method that may be executed by the example clamp manager of FIG. 13 to facilitate component connection detections.

FIG. 18 is a flowchart representative of an example method 1800 that may be executed to implement the example PAS platform 140 of FIGS. 1 and/or 2. The example method 1800 of FIG. 18 may be used to support block 1410 of FIG. 14 to execute single-use equipment/process(es). The method 1800 of FIG. 18 begins at block 1802 when the PAS platform 140 completes assembly of the SUE. At block 1804, the PAS platform 140 monitors the port connections of the single-use components. For example, the connection monitor 210 (FIG. 2) may continue to monitor signals received from the clamp manager 1310 (FIG. 13) to determine if a connection is disconnected (e.g., a verified physical connection is disconnected).

At block 1806, the example connection monitor 210 issues a warning. For example, the connection monitor 210 may present an alert indicating a physical connection is unverified. In some examples, the connection monitor 210 may identify the physical connection that was detected as unverified and/or the single-use component associated with the unverified physical connection. In some examples, the connection monitor 210 may deactivate the control interface in response to detecting an unverified physical connection in the SUE.

At block 1808, the connection monitor 210 determines whether the executing batch is completed. If, at block 1808, the connection monitor 210 determines that execution of the batch is not complete, then control returns to block 1804 to continue to monitor port connections in the process control system 104. If, at block 1808, the connection monitor 210 determines that execution of the batch is complete, the example method 1800 of FIG. 18 ends.

FIG. 19 is a flowchart representative of an example method 1900 that may be executed to implement the example clamp manager 1310 of FIG. 13 to monitor component connections. The method 1900 of FIG. 19 begins at block 1902 when the example clamp manager 1310 determines whether the smart-clamp 1300 is in a closed-position or an open-position. For example, the clamp manager 1310 may monitor the connection sensors 1306-1309 to determine when the smart-clamp 1300 is in the closed-position. If, at block 1902, the clamp manager 1310 determines that the smart-clamp 1300 is in the open-position (e.g., the connection sensors 1306, 1308 indicate that they are not proximate to the connection sensors 1307, 1309), then control returns to block 1902 to wait to determine the smart-clamp 1300 is in the closed-position.

If, at block 1902, the example clamp manager 1310 determines that the smart-clamp 1300 is in the closed-position, then, at block 1904, the clamp manager 1310 determines whether the smart-clamp 1300 is in the engaged state. For example, the clamp manager 1310 may monitor the connection sensors 1306-1309 for a signal indicating that they are in contact with and/or proximate to a component. If, at block 1904, the clamp manager 1310 determines that the smart-clamp 1300 is not in the engaged state, then control returns to block 1902 to detect when the smart-clamp 1300 is in the closed-position.

If, at block 1904, the example clamp manager 1310 determines that the smart-clamp 1300 is in the engaged state, then, at block 1906, the clamp manager 1310 facilitates reading component identifying information from the component(s). For example, the clamp manager 1310 may cause the connection sensors 1306, 1307 to scan the port 1330 for component identifying information. In some examples, the clamp manager 1310 may prompt a user to scan the component for component identifying information. At block 1908, the clamp manager 1310 reports the component identifying information to the PAS system 140 (FIGS. 1 and/or 2). For example, the clamp manager 1310 may communicate the component identifying information to the PAS system 140 via a wireless connection, the example data buses 110 of FIG. 1, etc. At block 1910, the clamp manager 1310 monitors the smart-clamp 1300. For example, the clamp manager 1310 may wait for a signal from the PAS system 140, may monitor the connection for a disconnection, etc.

At block 1912, the clamp manager 1310 determines whether a disconnect event is detected. For example, the clamp manager 1310 may receive an indication (e.g., a signal) from one or more of the connection sensor(s) 1306-1309 that the smart-clamp 1300 is not in the closed position. Additionally or alternatively, the clamp manager 1310 may receive an indication (e.g., signal) that the smart-clamp 1300 is not in the engaged state. For example, a component may have moved, the smart-clamp 1300 may have been bumped, etc., resulting in the clamp manager 1310 determining that the smart-clamp 1300 is no longer engaged. If, at block 1912, the clamp manager 1310 does not detect a disconnection event, then control returns to block 1910 to monitor the connection.

If, at block 1912, the clamp manager 1310 did detect a disconnection event, then, at block 1914, the clamp manager 1310 reports the disconnection event to the PAS system 140. For example, the clamp manager 1310 may communicate the disconnection event to the PAS system 140 via a wireless connection, the example data buses 110 of FIG. 1, etc. In some examples, the clamp manager 1310 transitions the status indicator 1311 to an inactive state (e.g., a red color) if, for example, the status indicator 1311 was in the activated state prior to the disconnection event. At block 1916, the clamp manager 1310 determines whether to power-off the smart-clamp 1300. If, at block 1916, the clamp manager 1310 determines not to power-off the smart-clamp 1300, then control returns to block 1902 to determine whether the smart-clamp 1300 is in the closed position. If, at block 1916, the clamp manager 1310 determines to power-off the smart-clamp 1300, the clamp manager 1310 powers-down the smart-clamp 1300 and the example method 1900 of FIG. 19 ends. For example, the clamp manager 1310 may transition the status indicator 1311 to the inactive state.

Figure 20:
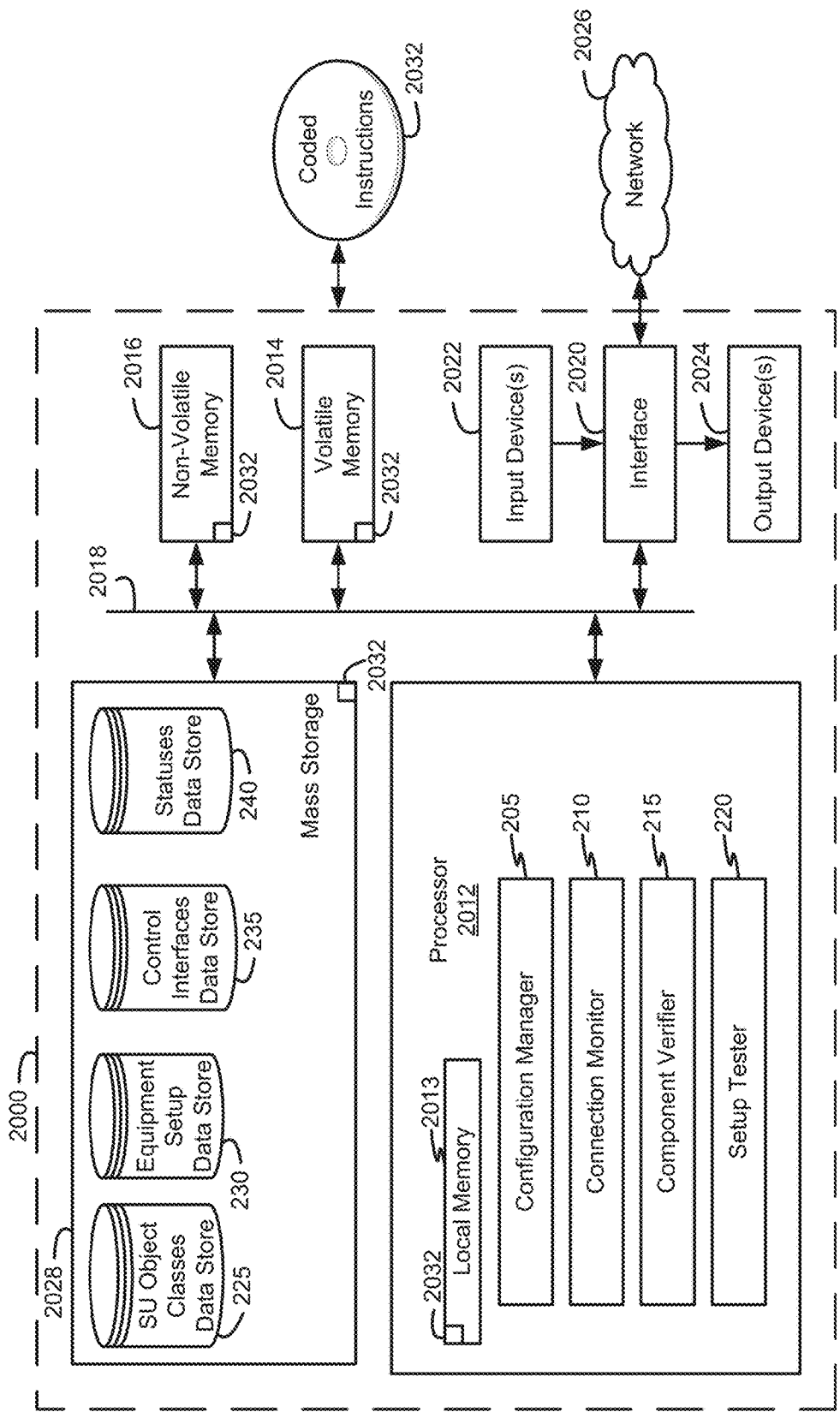
FIG. 20 is a block diagram of an example processing platform structured to execute the example machine-readable instructions to implement the methods of FIGS. 14-19 and/or the example PAS platform of FIGS. 1 and/or 2.

FIG. 20 is a block diagram of an example processor platform 2000 capable of executing instructions to implement the methods of FIGS. 14-19 and the PAS platform 140 of FIGS. 1 and/or 2 and/or the clamp manager 1310 of FIG. 13. The processor platform 2000 can be, for example, a server, a personal computer, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer.

The processor 2012 of the illustrated example includes a local memory 2013 (e.g., a cache). The processor 2012 of the illustrated example executes the instructions to implement the example configuration manager 205, the example connection monitor 210, the example component verifier 215 and the example setup tester 220. The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), and/or a PCI express interface.

In the illustrated example, one or more input devices 2022 are connected to the interface circuit 2020. The input device(s) 2022 permit(s) a user to enter data and commands into the processor 2012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2020 of the illustrated example, thus, typically includes a graphics driver card, a graphics driver chip or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives. The example mass storage 2028 implements the example SU object classes data store 225, the example equipment setup data store 230, the example control interfaces data store 235 and the example statuses data store 240.

Coded instructions 2032 to implement the methods of FIGS. 14-19 may be stored in the mass storage device 2028, in the volatile memory 2014, in the non-volatile memory 2016, and/or on a removable tangible computer readable storage medium such as a CD or DVD.

From the foregoing, it will be appreciated that the above disclosed methods, apparatus and articles of manufacture facilitate setup of single-use equipment/process(es) in a single-use process control system. For example, disclosed examples include a graphical control interface representative of the process control system and an equipment setup table. In some examples, the example graphical control interface may be used to design the graphical representation of the process control system. Disclosed examples utilize the equipment setup table to verify the single-use components used in the SUE are the correct single-use components. In some examples, smart-clamps are used to fasten the single-use components.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to setup a single-use process, the method comprising:
    configuring a control interface via an object-oriented programming interface by:
        constructing a graphical interface using a single-use (SU) object; and
        configuring an equipment setup table based on a first characteristic of a single-use component, the object-oriented programming interface including an object class representative of the single-use component in the single-use process;
    receiving an indication from a sensor engaged with a port of the single-use component;
    transitioning a port indicator associated with the port from an inactive state to an active state in the graphical interface;
    updating a SU object status table to indicate the port is connected; and
    activating the SU object in the control interface in response to:
        detecting that all ports associated with the single-use component are connected based on the indication from the sensor engaged with the port of the single-use component; and
        verifying the single-use component.

2. The method as defined in claim 1, wherein the SU object is an instance of the object class.

3. The method as defined in claim 1, wherein the sensor is associated with a clamp.

4. The method as defined in claim 1, wherein the first characteristic includes at least a part number or a model number.

5. The method as defined in claim 1, further including:
    retrieving component identifying information from the single-use component; and
    comparing the retrieved component identifying information to a corresponding first characteristic in the equipment setup table to verify the single-use component.

6. The method as defined in claim 5, further including comparing the retrieved component identifying information to a second characteristic associated with the single-use component in a bill of materials table.

7. The method as defined in claim 6, wherein the second characteristic is a lot number.

8. The method as defined in claim 1, further including, in response to verifying the single-use component, transitioning the SU object from an inactive state to an active state in the graphical interface.

9. The method as defined in claim 1, further including validating the single-use process by:
    confirming all electrical connections in the single-use process; and
    transitioning the control interface to an activated control interface.

10. The method as defined in claim 1, further including performing an integrity test on the single-use process.

11. The method as defined in claim 1, further including operating the single-use process by:
    monitoring port connections for a change in connection status;
    detecting an unverified port connection based on the indication received from a clamp including the sensor associated with the port in the single-use process; and
    issuing a warning in response to the detecting of the unverified port connection.

12. An apparatus for setting-up a single-use process, the apparatus comprising:
    a processor system; and
    a memory communicatively coupled to the processor system, the memory including stored instructions that enable the processor system to:
        configure a control interface via an object-oriented programming interface by:
            constructing a graphical interface using a single-use (SU) object; and configuring an equipment setup table based on a first characteristic of a single-use component, the object-oriented programming interface including an object class representative of the single-use component in the single-use process;

transition a port indicator corresponding to a port associated with the single-use component from an inactive state to an active state in the graphical interface in response to an indication received from a sensor engaged with the port;

update a SU object status table to indicate the port is connected; and activate the SU object in the control interface in response to detecting that all ports associated with the single-use component are connected based on the indication from the sensor engaged with the port associated with the single-use component, the SU object being an instance of the object class.

13. The apparatus as defined in claim 12, wherein the sensor is associated with a clamp.

14. The apparatus as defined in claim 12, wherein the instructions enable the processor system to:

retrieve component identifying information from the single-use component; and compare the retrieved component identifying information to a corresponding first characteristic in the equipment setup table to verify the single-use component.

15. The apparatus as defined in claim 12, wherein the instructions enable the processor system to validate the single-use process by:

confirming all electrical connections in the single-use process; and transitioning the control interface to an activated control interface.

16. The apparatus as defined in claim 12, wherein the instructions enable the processor system to transition the single-use object from an inactive state to an active state in the graphical interface when the single-use component is verified.

17. The apparatus as defined in claim 12, wherein the instructions enable the processor system to operate the single-use process by:

monitoring port connections for a change in connection status;

detecting an unverified port connection based on an indication received from a clamp associated with the port in the single-use process; and issuing a warning in response to the detecting of the unverified port connection.

18. A tangible computer readable storage medium comprising instructions that, when executed, cause a machine to at least:

configure a control interface via an object-oriented programming interface by:

constructing a graphical interface using a single-use (SU) object; and configuring an equipment setup table based on a first characteristic of a single-use component, the object-oriented programming interface including an object class representative of the single-use component in a single-use process;

transition a port indicator corresponding to a port associated with the single-use component from an inactive state to an active state in the graphical interface in response to an indication received from a sensor engaged with the port;

update a SU object status table to indicate the port is connected; and activate the SU object in the control interface in response to:

detecting that all ports associated with the single-use component are connected based on the indication from the sensor engaged with the port associated with the single-use component; and verifying the single-use component, the SU object being an instance of the object class.

19. The tangible computer readable storage medium as defined in claim 18, wherein the instructions further cause the machine to validate the single-use process by:

confirming all electrical connections in the single-use process; and transitioning the control interface to an activated control interface.

20. The tangible computer readable storage medium as defined in claim 18, wherein the instructions further cause the machine to operate the single-use process by:

monitoring port connections for a change in connection status;

detecting an unverified port connection based on the indication received from a clamp including the sensor associated with the port in the single-use process; and issuing a warning in response to the detecting of the unverified port connection.

* * * * *